(12) United States Patent
Wood et al.

(10) Patent No.: US 11,249,634 B2
(45) Date of Patent: Feb. 15, 2022

(54) METHOD, SYSTEM, AND COMPUTER PROGRAM PRODUCT FOR CONFIGURING AT LEAST ONE RULE VIA A GRAPHICAL USER INTERFACE

(71) Applicant: Visa International Service Association, San Francisco, CA (US)

(72) Inventors: Nathan Ryan Wood, Medford, MA (US); Carl David Tucker, Jr., Colorado Springs, CO (US); Benjamin Scott Boding, Mountain View, CA (US); Cory Howard Siddens, Mountain View, CA (US); Andrew John Bruno Naumann zu Koenigsbrueck, Princeton, NJ (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/055,696

(22) PCT Filed: May 29, 2019

(86) PCT No.: PCT/US2019/034391
§ 371 (c)(1),
(2) Date: Nov. 16, 2020

(87) PCT Pub. No.: WO2019/232047
PCT Pub. Date: Dec. 5, 2019

(65) Prior Publication Data
US 2021/0191608 A1 Jun. 24, 2021

Related U.S. Application Data

(60) Provisional application No. 62/678,523, filed on May 31, 2018.

(51) Int. Cl.
*G06F 3/0484* (2013.01)
*G06F 9/451* (2018.01)
(Continued)

(52) U.S. Cl.
CPC .......... *G06F 3/04847* (2013.01); *G06F 9/451* (2018.02); *G06N 5/02* (2013.01); *G06Q 20/389* (2013.01)

(58) Field of Classification Search
CPC ... G06F 3/04847; G06F 9/451; G06Q 20/389; G06N 5/02
See application file for complete search history.

(56) References Cited

U.S. PATENT DOCUMENTS

D536,340 S    2/2007  Jost et al.
7,324,118 B2 * 1/2008  Fujioka .................... G09G 5/02
                                                         345/589
(Continued)

OTHER PUBLICATIONS

"Accept more good orders with CyberSource fraud management solutions", CyberSource, Jan. 3, 2017, https://youtube/tJHhkjh971Q, 1 page.

(Continued)

*Primary Examiner* — Phenuel S Salomon
(74) *Attorney, Agent, or Firm* — The Webb Law Firm

(57) ABSTRACT

Provided is a method for configuring at least one rule, e.g., using a graphical user interface. The method may include displaying a graphical user interface including a polygon having at least three edges and an icon at a first position within the polygon. Each edge of the polygon may be associated with a potential outcome of at least one rule. An input to move the icon to a second position within the polygon may be received. The graphical user interface may be displayed with the icon at the second position within the polygon. A distance from the second position of the icon to each edge of the polygon may be determined. The rule(s)

(Continued)

may be adjusted based on the distance from the second position of the icon to each edge of the polygon. A system and computer program product are also disclosed.

16 Claims, 9 Drawing Sheets

(51) Int. Cl.
*G06N 5/02* (2006.01)
*G06Q 20/38* (2012.01)

(56) References Cited

U.S. PATENT DOCUMENTS

| | | | |
|---|---|---|---|
| D599,375 S | 9/2009 | Wipplinger | |
| 7,619,641 B2* | 11/2009 | Shih | G09G 3/3607 |
| | | | 345/694 |
| 7,800,782 B2* | 9/2010 | Kanai | H04N 1/6058 |
| | | | 358/1.9 |
| 8,122,510 B2* | 2/2012 | Byers | H04L 63/1433 |
| | | | 726/25 |
| 8,228,375 B2* | 7/2012 | Liu | H04N 13/324 |
| | | | 348/51 |
| 8,384,747 B2* | 2/2013 | Van Berkel | G02F 1/133514 |
| | | | 345/694 |
| 8,401,284 B2* | 3/2013 | Pettigrew | H04N 1/62 |
| | | | 382/162 |
| D706,822 S | 6/2014 | Wang | |
| D710,863 S | 8/2014 | Agnew | |
| D719,179 S | 12/2014 | Daniel | |
| D754,677 S | 4/2016 | Takizawa et al. | |
| D755,824 S | 5/2016 | Hwang et al. | |
| D773,509 S | 12/2016 | Bistoni et al. | |
| D774,542 S | 12/2016 | Miao et al. | |
| D777,197 S | 1/2017 | Miao et al. | |
| D783,040 S | 4/2017 | Wingate-Whyte et al. | |
| D791,812 S | 7/2017 | Bistoni et al. | |
| D822,683 S | 7/2018 | Leininger et al. | |
| D831,043 S | 10/2018 | Leininger et al. | |
| D831,044 S | 10/2018 | Leininger et al. | |
| D831,045 S | 10/2018 | Leininger et al. | |
| 10,318,138 B2 | 6/2019 | Scholer et al. | |
| D853,409 S | 7/2019 | Esselstrom et al. | |
| D864,227 S | 10/2019 | Luchner et al. | |
| D868,107 S | 11/2019 | Aggarwal et al. | |
| 2009/0322782 A1* | 12/2009 | Kimchi | G06F 16/25 |
| | | | 345/619 |
| 2010/0217736 A1* | 8/2010 | Sarel | G16H 50/20 |
| | | | 706/47 |
| 2012/0041990 A1* | 2/2012 | Kreindlina | G06F 16/248 |
| | | | 707/805 |
| 2012/0123989 A1* | 5/2012 | Yu | G06Q 10/0639 |
| | | | 706/47 |
| 2014/0218389 A1* | 8/2014 | Bennett | G06F 21/577 |
| | | | 345/593 |
| 2015/0261412 A1* | 9/2015 | Guillama | G06F 3/0482 |
| | | | 715/835 |
| 2016/0210711 A1 | 7/2016 | Krupa et al. | |
| 2016/0232370 A1 | 8/2016 | Rissanen et al. | |
| 2017/0160916 A1 | 6/2017 | Baumgarten et al. | |

OTHER PUBLICATIONS

"Modern info graphic for business project." iconswebsite.com. Published Jul. 28, 2014. Accessed Aug. 15, 2019. Available online at URL: http://iconswebsite.com/depositphotos-vector/modern-info-graphic-for-busi- ness-project-50204821.html (Year: 2014).

"The Balancing Act, Minimise Fraud. Minimise Costs. Maximise Revenue.", 2016 UK eCommerce Fraud Report, 3 pages.

"Vector up arrows infographic . . . " depositphotos.com. Uploaded Jan. 9, 2017. Accessed Aug. 15, 2019. Available online at URL: https://depositphotos.com/136921078/stock-illustration-vector-up-arrows-i- nfographic-diagram.html (Year: 2017).

* cited by examiner

METHOD, SYSTEM, AND COMPUTER PROGRAM PRODUCT FOR CONFIGURING AT LEAST ONE RULE VIA A GRAPHICAL USER INTERFACE

CROSS REFERENCE TO RELATED APPLICATIONS

This application is the United States national phase of International Application No. PCT/US2019/034391 filed May 29, 2019, and claims priority to U.S. Patent Application No. 62/678,523, filed May 31, 2018, which are incorporated herein by reference in their entirety.

BACKGROUND

1. Field

This disclosed subject matter relates generally to methods, systems, and products for configuring at least one rule and, in some particular embodiments or aspects, to a method, system, and computer program product for configuring at least one rule via a graphical user interface.

2. Technical Considerations

Transaction service providers may process a high volume of transactions (e.g., authorization requests and/or authorization responses) every day. For example, a transaction service provider system in an electronic payment processing network may process thousands of transactions per second. Some of those transactions may be fraudulent, but it may be difficult to determine which transactions are potentially and/or actually fraudulent. Certain transaction provider systems may provide and/or employ various rules for assessing the likelihood that a transaction is fraudulent. For example, such rules may be based on various factors (e.g., transaction data, inputs, and/or the like) and/or parameters, settings, and/or the like. The rules and/or the parameters, settings, and/or the like of the rules may be different based on the scenario in which they are being used.

However, it may be challenging for merchants (e.g., small or medium-sized merchants) to manage fraud. For example, such merchants may lack the resources, understanding, technology, and/or the like to accurately and successfully manage fraud. Additionally or alternatively, selecting and/or adjusting the rules used to detect potential fraud may require research (e.g., collection and/or analysis of data and/or the like), constant monitoring, and/or balancing of the different goals of the merchant, which may be different for each merchant and/or may change over time. Such requirements may pose a significant burden on the merchant (e.g., a small or medium-sized merchant). Moreover, fraud management may involve various costs to the merchant, including direct cost of fraudulent transactions (e.g., the currency and/or dollar amount of fraudulent transactions), operation costs (e.g., to research fraud, to monitor transactions, to review potentially fraudulent transactions, and/or the like), and administrative cost (e.g., quality of customer experience).

SUMMARY

Accordingly, it is an object of the presently disclosed subject matter to provide methods, systems, and computer program products for configuring at least one rule.

According to non-limiting embodiments or aspects, provided is a method for configuring at least one rule. In some non-limiting embodiments or aspects, a method for configuring at least one rule may include displaying, with at least one processor, a graphical user interface. The graphical user interface may include a polygon having at least three edges and an icon at a first position within the polygon. Each edge of the polygon may be associated with a potential outcome of at least one rule. An input to move the icon to a second position within the polygon may be received. The graphical user interface may be displayed with the icon at the second position within the polygon. A distance from the second position of the icon to each edge of the polygon may be determined. The rule(s) may be adjusted based on the distance from the second position of the icon to each edge of the polygon.

In some non-limiting embodiments or aspects, before receiving the input, a probability of each potential outcome may be inversely related to a distance from the first position of the icon to a respective edge of the at least three edges. Additionally or alternatively, after adjusting the at least one rule, a probability of each potential outcome may be inversely related to a distance from the second position of the icon to a respective edge of the at least three edges.

In some non-limiting embodiments or aspects, the at least one rule may have at least one parameter. Additionally or alternatively, before receiving the input, a value of the at least one parameter may be based on a distance from the first position of the icon to each edge of the polygon. In some non-limiting embodiments or aspects, adjusting the rule(s) may include adjusting the value of the parameter(s) based on the distance from the second position of the icon to each edge of the polygon. In some non-limiting embodiments or aspects, a probability of each potential outcome may be based at least partially on the value of the at least one parameter.

In some non-limiting embodiments or aspects, the rule(s) may include a first rule. The first rule may include generating a score. Additionally or alternatively, the parameter(s) of the first rule may include a first threshold and a second threshold greater than the first threshold. In some non-limiting embodiments or aspects, a first potential outcome of the first rule may be associated with the score being below the first threshold. Additionally or alternatively, a second potential outcome of the first rule may be associated with the score being between the first threshold and the second threshold. Additionally or alternatively, a third potential outcome of the first rule may be associated with the score being above the second threshold.

In some non-limiting embodiments or aspects, the rule(s) may include a plurality of rules. Additionally or alternatively, adjusting the rule(s) may include at least one of removing a rule from the plurality of rules or adding a rule to the plurality of rules.

In some non-limiting embodiments or aspects, the rule(s) may be stored on a remote computer system. Additionally or alternatively, adjusting the rule(s) may include communicating adjustment data associated with the distance from the second position of the icon to each edge of the polygon to the remote computer system.

In some non-limiting embodiments or aspects, the remote computer system may receive transaction data associated with a plurality of payment transactions. Additionally or alternatively, the remote computer system may determine an outcome for each payment transaction based on the rule(s). Additionally or alternatively, the outcome for each payment transaction may include one of the potential outcomes of the rule(s).

In some non-limiting embodiments or aspects, a textual label may be displayed within the graphical user interface adjacent each edge of the polygon. Each textual label may be associated with the outcome associated with a respective edge of the at least three edges of the polygon. In some non-limiting embodiments or aspects, a legend may be displayed within the graphical user interface. The legend may include a list of the potential outcomes and/or a probability of each potential outcome. In some non-limiting embodiments or aspects, before receiving the input, the probability of each potential outcome may be inversely related to a distance from the first position of the icon to a respective edge of the polygon. Additionally or alternatively, after adjusting the rule(s), the probability of each potential outcome may be inversely related to a distance from the second position of the icon to a respective edge of the polygon.

In some non-limiting embodiments or aspects, the graphical user interface may include a vertex between each pair of adjacent edges of the at least three edges. Additionally or alternatively, the vertices at the ends of each edge and the icon may define a triangular area associated with each edge. In some non-limiting embodiments or aspects, each triangular area may include a different color.

According to non-limiting embodiments or aspects, provided is a system for configuring at least one rule. In some non-limiting embodiments or aspects, the system for configuring at least one rule may include a user device, which may be configured to display a graphical user interface including a polygon having at least three edges and an icon at a first position within the polygon. Each edge of the polygon may be associated with a potential outcome of at least one rule. An input to move the icon to a second position within the polygon may be received. The graphical user interface may be displayed with the icon at the second position within the polygon. Position data associated with the second position of the icon within the polygon may be transmitted. A remote computer system may be configured to receive the position data associated with the second position of the icon within the polygon transmitted from the user device. The at least one rule may be adjusted based on a distance from the second position of the icon to each edge of the polygon.

In some non-limiting embodiments or aspects, the user device may determine the distance from the second position of the icon to each edge of the polygon. In some non-limiting embodiments or aspects, the remote computer system may determine the distance from the second position of the icon to each edge of the polygon.

In some non-limiting embodiments or aspects, before receiving the input, a probability of each potential outcome may be inversely related to a distance from the first position of the icon to a respective edge of the at least three edges. In some non-limiting embodiments or aspects, after adjusting the at least one rule, a probability of each potential outcome may be inversely related to a distance from the second position of the icon to a respective edge of the at least three edges.

In some non-limiting embodiments or aspects, the rule(s) may have at least one parameter. Additionally or alternatively, before receiving the input, a value of the parameter(s) may be based on a distance from the first position of the icon to each edge of the polygon. In some non-limiting embodiments or aspects, adjusting the rule(s) may include adjusting the value of the parameter(s) based on the distance from the second position of the icon to each edge of the polygon. In some non-limiting embodiments or aspects, a probability of each potential outcome may be based at least partially on the value of the at least one parameter.

In some non-limiting embodiments or aspects, the rule(s) may include a first rule. The first rule may include generating a score. Additionally or alternatively, the parameter(s) of the first rule may include a first threshold and a second threshold greater than the first threshold. In some non-limiting embodiments or aspects, a first potential outcome of the first rule may be associated with the score being below the first threshold. Additionally or alternatively, a second potential outcome of the first rule may be associated with the score being between the first threshold and the second threshold. Additionally or alternatively, a third potential outcome of the first rule may be associated with the score being above the second threshold.

In some non-limiting embodiments or aspects, the rule(s) may include a plurality of rules. Additionally or alternatively, adjusting the rule(s) may include at least one of removing a rule from the plurality of rules and/or adding a rule to the plurality of rules.

In some non-limiting embodiments or aspects, the remote computer system may receive transaction data associated with a plurality of payment transactions. Additionally or alternatively, the remote computer system may determine an outcome for each payment transaction of the plurality of payment transactions based on the rule(s). Additionally or alternatively, the outcome for each payment transaction may be one of the potential outcomes of the rule(s).

In some non-limiting embodiments or aspects, the user device may display a textual label within the graphical user interface adjacent each edge of the polygon. Additionally or alternatively, each textual label may be associated with the outcome associated with a respective edge of the polygon. In some non-limiting embodiments or aspects, the user device may display a legend within the graphical user interface. Additionally or alternatively, the legend may include a list of the potential outcomes and a probability of each potential outcome.

In some non-limiting embodiments or aspects, before receiving the input, the probability of each potential outcome may be inversely related to a distance from the first position of the icon to a respective edge of the polygon. In some non-limiting embodiments or aspects, after adjusting the rule(s), the probability of each potential outcome may be inversely related to a distance from the second position of the icon to a respective edge of the at least three edges.

In some non-limiting embodiments or aspects, the graphical user interface may include a vertex between each pair of adjacent edges of the polygon. The vertices at the ends of each edge and the icon may define a triangular area associated with each edge. In some non-limiting embodiments or aspects, each triangular area may include a different color.

According to non-limiting embodiments or aspects, provided is a computer program product for configuring at least one rule. The computer program product may include at least one non-transitory computer-readable medium including one or more instructions that, when executed by at least one processor, cause the at least one processor to display a graphical user interface, which may include a polygon having at least three edges and an icon at a first position within the polygon. Each edge of the polygon may be associated with a potential outcome of at least one rule. An input to move the icon to a second position within the polygon may be received. The graphical user interface may be displayed with the icon at the second position within the polygon. A distance from the second position of the icon to each edge of the polygon may be determined. The rule(s)

may by adjusted based on the distance from the second position of the icon to each edge of the polygon.

Further non-limiting embodiments or aspects are set forth in the following numbered clauses:

Clause 1: A method for configuring at least one rule, comprising: displaying, with at least one processor, a graphical user interface comprising a polygon having at least three edges and an icon at a first position within the polygon, wherein each edge of the polygon is associated with a potential outcome of at least one rule; receiving, with the at least one processor, an input to move the icon to a second position within the polygon; displaying, with at least one processor, the graphical user interface with the icon at the second position within the polygon; determining, with the at least one processor, a distance from the second position of the icon to each edge of the polygon; and adjusting, with the at least one processor, the at least one rule based on the distance from the second position of the icon to each edge of the polygon.

Clause 2: The method of clause 1, wherein, before receiving the input, a probability of each potential outcome is inversely related to a distance from the first position of the icon to a respective edge of the at least three edges.

Clause 3: The method of clauses 1 or 2, wherein, after adjusting the at least one rule, a probability of each potential outcome is inversely related to a distance from the second position of the icon to a respective edge of the at least three edges.

Clause 4: The method of any of clauses 1-3, wherein the at least one rule has at least one parameter, and wherein, before receiving the input, a value of the at least one parameter is based on a distance from the first position of the icon to each edge of the polygon.

Clause 5: The method of any of clauses 1-4, wherein adjusting the at least one rule comprises adjusting the value of the at least one parameter based on the distance from the second position of the icon to each edge of the polygon.

Clause 6: The method of any of clauses 1-5, wherein a probability of each potential outcome is based at least partially on the value of the at least one parameter.

Clause 7: The method of any of clauses 1-6, wherein the at least one rule comprises a first rule, the first rule comprising generating a score, wherein the at least one parameter of the first rule comprises a first threshold and a second threshold greater than the first threshold, and wherein a first potential outcome of the first rule is associated with the score being below the first threshold; a second potential outcome of the first rule is associated with the score being between the first threshold and the second threshold; and a third potential outcome of the first rule is associated with the score being above the second threshold.

Clause 8: The method of any of clauses 1-7, wherein the at least one rule comprises a plurality of rules, and wherein adjusting the at least one rule comprises at least one of removing a rule from the plurality of rules and adding a rule to the plurality of rules.

Clause 9: The method of any of clauses 1-8, wherein the at least one rule is stored on a remote computer system, and wherein adjusting the at least one rule comprises communicating adjustment data associated with the distance from the second position of the icon to each edge of the polygon to the remote computer system.

Clause 10: The method of any of clauses 1-9, further comprising receiving, at the remote computer system, transaction data associated with a plurality of payment transactions; and determining, with the remote computer system, an outcome for each payment transaction of the plurality of payment transactions based on the at least one rule, wherein the outcome for each payment transaction comprises one of the potential outcomes of the at least one rule.

Clause 11: The method of any of clauses 1-10, further comprising displaying, with the at least one processor, a textual label within the graphical user interface adjacent each edge of the polygon, each textual label associated with the potential outcome associated with a respective edge of the at least three edges of the polygon.

Clause 12: The method of any of clauses 1-11, further comprising displaying, with the at least one processor, a legend within the graphical user interface, the legend comprising a list of the potential outcomes and a probability of each potential outcome.

Clause 13: The method of any of clauses 1-12, wherein before receiving the input, the probability of each potential outcome is inversely related to a distance from the first position of the icon to a respective edge of the at least three edges; and after adjusting the at least one rule, the probability of each potential outcome is inversely related to a distance from the second position of the icon to a respective edge of the at least three edges.

Clause 14: The method of any of clauses 1-13, wherein the graphical user interface further comprises a vertex between each pair of adjacent edges of the at least three edges, the vertices at the ends of each edge and the icon defining a triangular area associated with each edge, each triangular area comprising a different color.

Clause 15: A system for configuring at least one rule, comprising a user device configured to display a graphical user interface comprising a polygon having at least three edges and an icon at a first position within the polygon, wherein each edge of the polygon is associated with a potential outcome of at least one rule; receive an input to move the icon to a second position within the polygon; display the graphical user interface with the icon at the second position within the polygon; and transmit position data associated with the second position of the icon within the polygon; and a remote computer system configured to: receive the position data associated with the second position of the icon within the polygon transmitted from the user device; and adjust the at least one rule based on a distance from the second position of the icon to each edge of the polygon.

Clause 16: The system of clause 15, wherein the user device is further configured to determine the distance from the second position of the icon to each edge of the polygon.

Clause 17: The system of clauses 15 or 16, wherein the remote computer system is further configured to determine the distance from the second position of the icon to each edge of the polygon.

Clause 18: The system of any of clauses 15-17, wherein, before receiving the input, a probability of each potential outcome is inversely related to a distance from the first position of the icon to a respective edge of the at least three edges.

Clause 19: The system of any of clauses 15-18, wherein, after adjusting the at least one rule, a probability of each potential outcome is inversely related to a distance from the second position of the icon to a respective edge of the at least three edges.

Clause 20: The system of any of clauses 15-19, wherein the at least one rule has at least one parameter, and wherein, before receiving the input, a value of the at least one parameter is based on a distance from the first position of the icon to each edge of the polygon.

Clause 21: The system of any of clauses 15-20, wherein adjusting the at least one rule comprises adjusting the value of the at least one parameter based on the distance from the second position of the icon to each edge of the polygon.

Clause 22: The system of any of clauses 15-21, wherein a probability of each potential outcome is based at least partially on the value of the at least one parameter.

Clause 23: The system of any of clauses 15-22, wherein the at least one rule comprises a first rule, the first rule comprising generating a score, wherein the at least one parameter of the first rule comprises a first threshold and a second threshold greater than the first threshold, and wherein: a first potential outcome of the first rule is associated with the score being below the first threshold; a second potential outcome of the first rule is associated with the score being between the first threshold and the second threshold; and a third potential outcome of the first rule is associated with the score being above the second threshold.

Clause 24: The system of any of clauses 15-23, wherein the at least one rule comprises a plurality of rules, and wherein adjusting the at least one rule comprises at least one of removing a rule from the plurality of rules and adding a rule to the plurality of rules.

Clause 25: The system of any of clauses 15-24, wherein the remote computer system is further configured to: receive transaction data associated with a plurality of payment transactions; and determine an outcome for each payment transaction of the plurality of payment transactions based on the at least one rule, wherein the outcome for each payment transaction comprises one of the potential outcomes of the at least one rule.

Clause 26: The system of any of clauses 15-25, wherein the user device is further configured to: display a textual label within the graphical user interface adjacent each edge of the polygon, each textual label associated with the potential outcome associated with a respective edge of the at least three edges of the polygon.

Clause 27: The system of any of clauses 15-26, wherein the user device is further configured to display a legend within the graphical user interface, the legend comprising a list of the potential outcomes and a probability of each potential outcome.

Clause 28: The system of any of clauses 15-27, wherein, before receiving the input, the probability of each potential outcome is inversely related to a distance from the first position of the icon to a respective edge of the at least three edges; and after adjusting the at least one rule, the probability of each potential outcome is inversely related to a distance from the second position of the icon to a respective edge of the at least three edges.

Clause 29: The system of any of clauses 15-28, wherein the graphical user interface further comprises a vertex between each pair of adjacent edges of the at least three edges, the vertices at the ends of each edge and the icon defining a triangular area associated with each edge, each triangular area comprising a different color.

Clause 30: A computer program product for configuring at least one rule, the computer program product comprising at least one non-transitory computer-readable medium including one or more instructions that, when executed by at least one processor, cause the at least one processor to: display a graphical user interface comprising a polygon having at least three edges and an icon at a first position within the polygon, wherein each edge of the polygon is associated with a potential outcome of at least one rule; receive an input to move the icon to a second position within the polygon; display the graphical user interface with the icon at the second position within the polygon; determine a distance from the second position of the icon to each edge of the polygon; and adjust the at least one rule based on the distance from the second position of the icon to each edge of the polygon.

Clause 31: A computer program product for configuring at least one rule, the computer program product comprising at least one non-transitory computer-readable medium including one or more instructions that, when executed by at least one processor, cause the at least one processor to perform the method of any one of clauses 1-14.

Clause 32: A non-transitory computer-readable medium comprising instructions to direct a processor to perform the method of any one of clauses 1-14.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which.

DESCRIPTION

Figure 1:
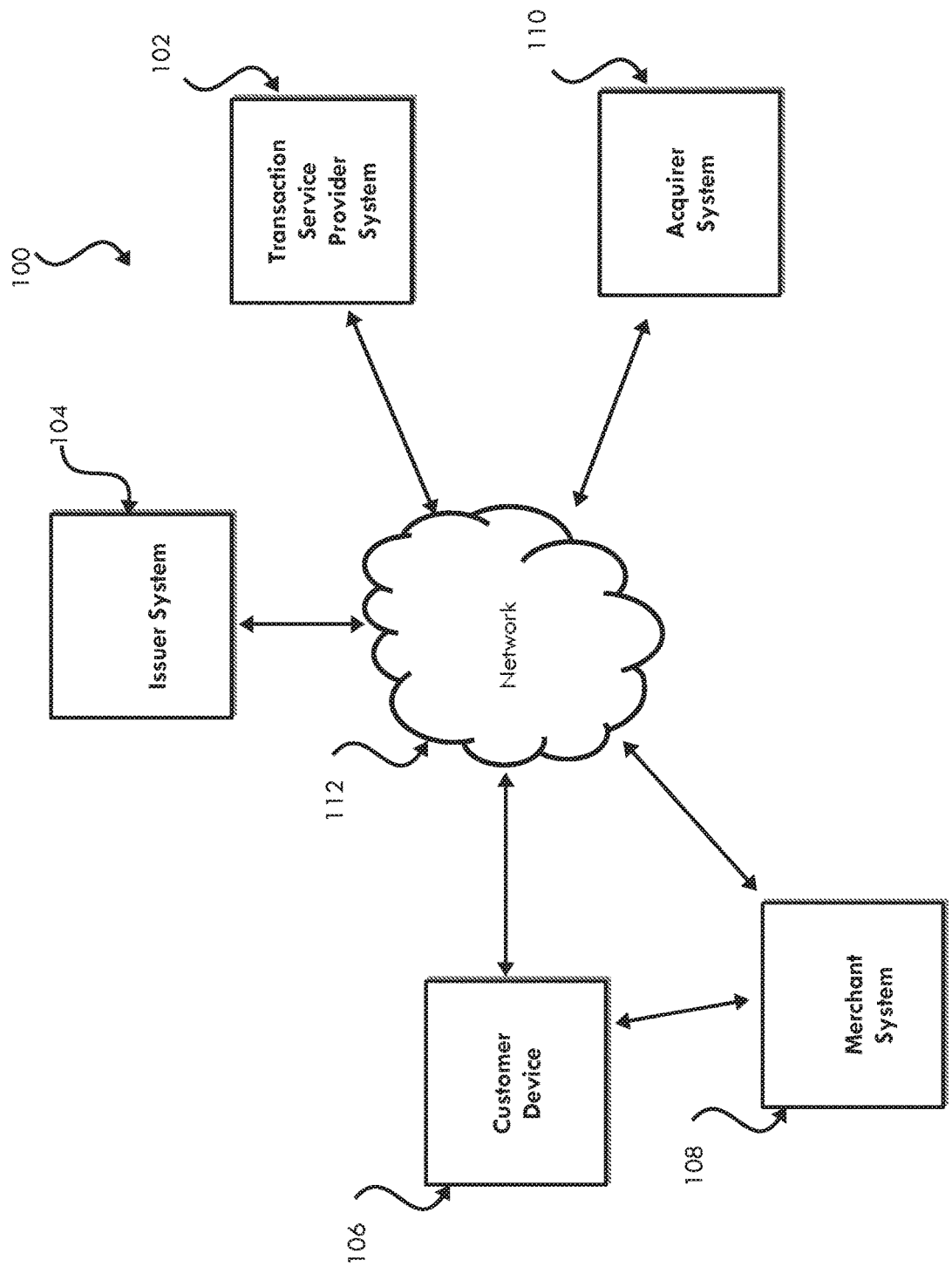
FIG. 1 is a diagram of some non-limiting embodiments or aspects of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical payment instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a physical payment instrument (e.g., a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a payment device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a client device may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a client may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed systems, methods, and computer program products for configuring at least one rule, including, but not limited to, configuring at least one rule via a graphical user interface. For example, non-limiting embodiments or aspects of the disclosed subject matter provide configuring at least one rule (e.g., on a remote computer system) with a graphical user interface by moving an icon within a polygon representing potential outcomes. Such embodiments or aspects provide techniques and systems for automatic adjustment of the rules to balance between potential outcomes and/or balance goals of the user. Additionally or alternatively, such techniques and systems include adjustment of the rule(s) with an easy to understand graphical user interface without the need to directly/manually manipulate the rules and without the need to directly/manually determine what effect each rule might have on potential outcomes. Additionally or alternatively, such techniques and systems provide for quick and automatic adjustment of the rule(s) over time as goals of the user change. Moreover, the disclosed subject matter may enable a merchant (e.g., a small or medium-sized merchant) to manage fraud without the burden of performing research, which may be extensive and/or expensive. Further, the disclose subject matter may reduce various costs to a merchant associated with managing fraud, including, but not limited to, reducing the direct cost of fraudulent transactions (e.g., the currency and/or dollar amount of fraudulent transactions), reducing operation costs (e.g., to research fraud, to monitor transactions, to review potentially fraudulent transactions, and/or the like), and/or reducing administrative cost (e.g., quality of customer experience).

For the purpose of illustration, in the following description, while the presently disclosed subject matter is described with respect to methods, systems, and computer program products for configuring at least one rule, e.g., to detect fraudulent transactions, one skilled in the art will recognize that the disclosed subject matter is not limited to the illustrative embodiments or aspects. For example, the methods, systems, and computer program products described herein may be used with a wide variety of settings, such as configuring at least one rule in any setting suitable for evaluating data using rules, e.g., to manage network traffic, to manage and/or filter electronic communications (e.g., emails, message, posts, and/or the like), to manage creation of and/or changes to accounts (e.g., at a bank, at a merchant, at a website, at a social networking platform, and/or the like), and/or the like.

Referring now to FIG. 1, FIG. 1 is a diagram of some non-limiting embodiments or aspects of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad-hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad-hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
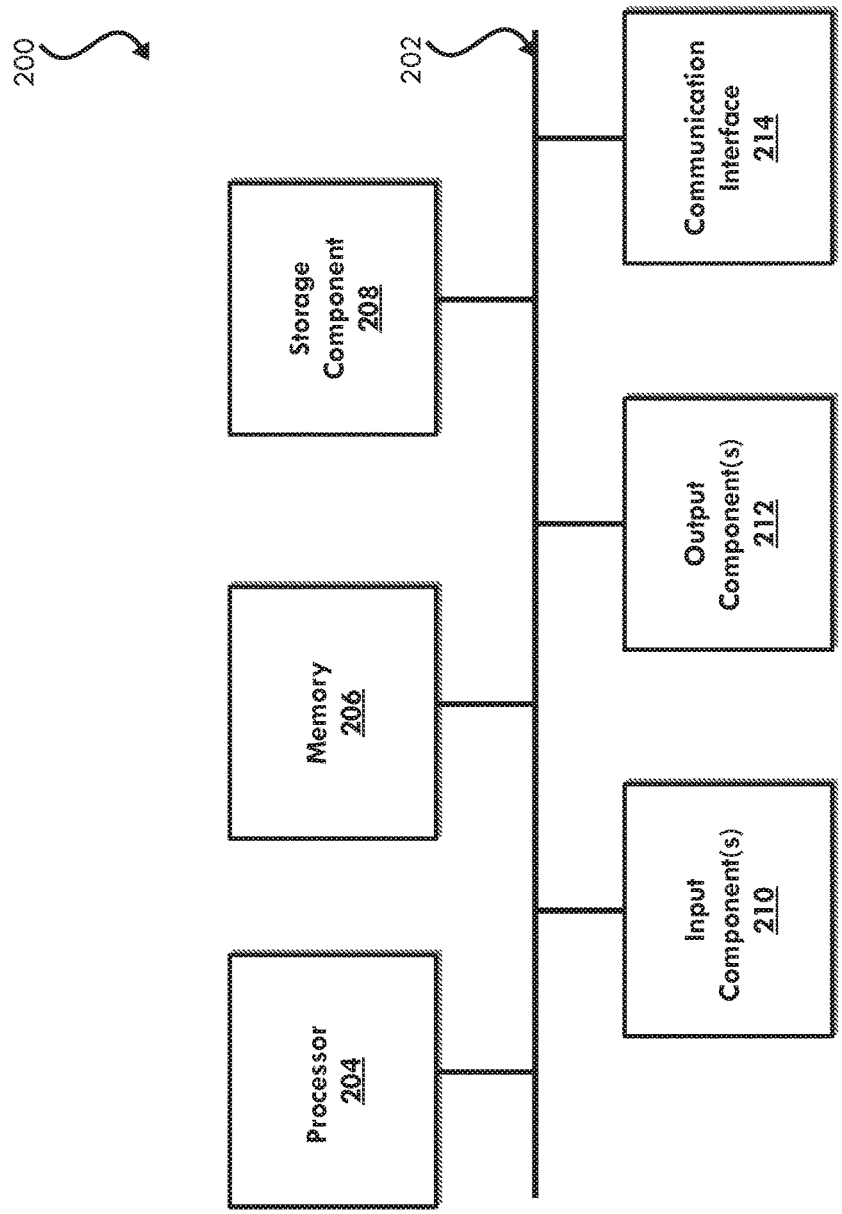
FIG. 2 is a diagram of some non-limiting embodiments or aspects of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
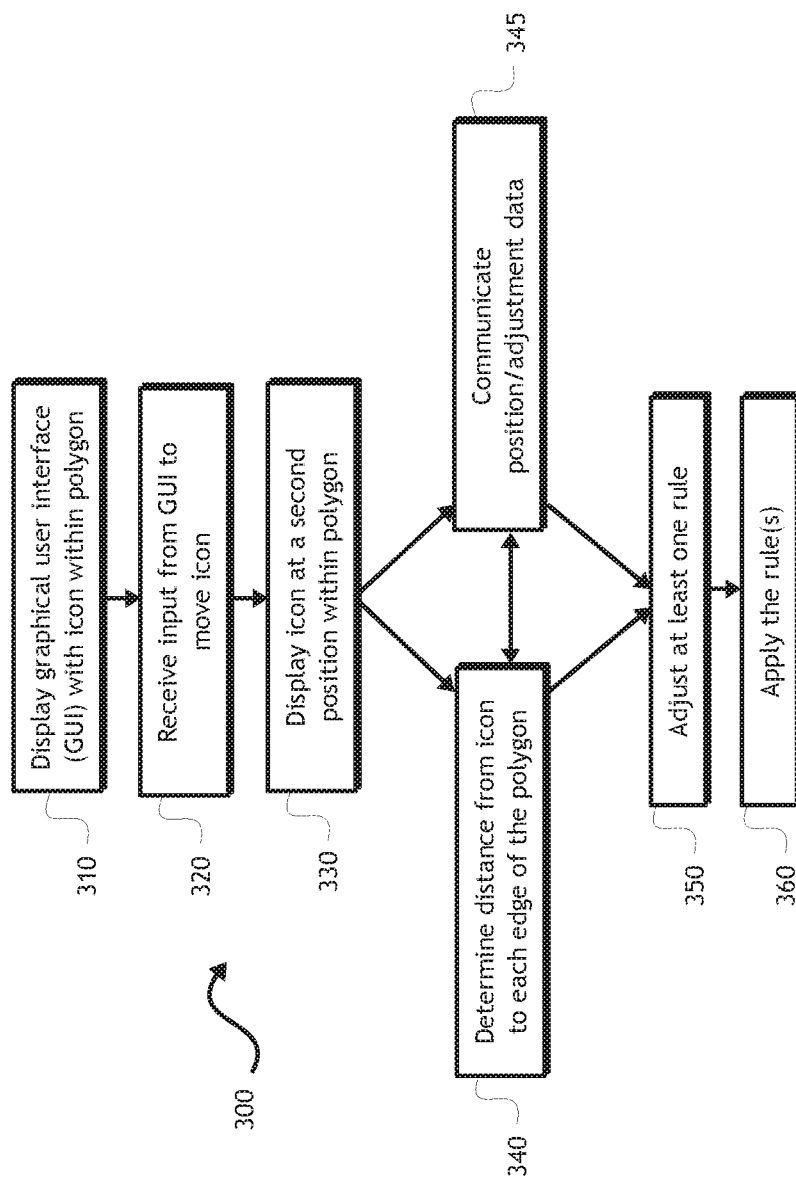
FIG. 3 is a flowchart of some non-limiting embodiments or aspects of a process for authenticating a device according to the principles of the presently disclosed subject matter.

Referring now to FIG. 3, FIG. 3 is a flowchart of some non-limiting embodiments or aspects of a process 300 for configuring at least one rule. In some non-limiting embodiments or aspects, one or more of the steps of process 300 may be performed (e.g., completely, partially, and/or the like) by merchant system 108 (e.g., one or more devices of merchant system 108). In some non-limiting embodiments or aspects, one or more of the steps of process 300 may be performed (e.g., completely, partially, and/or the like) by another system, another device, another group of systems, or another group of devices, separate from or including merchant system 108, such as transaction service provider system 102 (e.g., one or more devices of transaction service provider system 102), issuer system 104 (e.g., one or more devices of issuer system 104), customer device 106, and/or acquirer system 110 (e.g., one or more devices of acquirer system 110). In some non-limiting embodiments or aspects, with reference to FIG. 3, a user device may be the same as or similar to one or more devices of merchant system 108. Additionally or alternatively, a remote computer system may be the same as or similar to one or more devices of transaction service provider system 102.

As shown in FIG. 3, at step 310, process 300 may include displaying a graphical user interface. For example, a user device (e.g., a device of merchant system 108) may display the graphical user interface (e.g., on an output component 212). In some non-limiting embodiments or aspects, the graphical user interface may include a polygon and an icon at a position (e.g., first position) within the polygon. For example, the polygon may have at least three edges (e.g., sides). Additionally or alternatively, the edges may be straight, curved, and/or the like. In some non-limiting embodiments or aspects, each edge of the polygon may be associated with a potential outcome of a set of rules (e.g., at least one rule). Additionally or alternatively, at least one of the edges may represent some other concept, event, result, and/or the like. In some non-limiting embodiments or aspects, each outcome represented by an edge may be mutually exclusive of the other outcomes. Additionally or alternatively, at least one of the outcomes may overlap, coincide, and/or the like with at least one other outcome. In some non-limiting embodiments or aspects, the rule(s) may include (e.g., completely, partially, and/or the like) at least one predictive model. Additionally or alternatively, a predictive model may include at least one rule. In some non-limiting embodiments or aspects, the polygon may have any suitable shape. For example, the polygon may be a regular polygon, an equiangular polygon, an equilateral polygon, an irregular polygon, and/or the like.

In some non-limiting embodiments or aspects, the icon may be any suitable graphical element. For example, the icon may be a circle, a square, a triangle, a dot/point, an arrow, a polygon (e.g., smaller than the polygon within which the icon is positioned), an image, a logo, and/or the like. In some non-limiting embodiments or aspects, the (first) position may be any suitable position for the icon within the polygon. For example, an initial and/or default position may be the geometric center of the polygon. Additionally or alternatively, the position (e.g., first position) may be selected based on input of the user, may be a position where the user previously moved the icon, may be a representation of a previous/current state of the rules (e.g., based on previous/current settings, parameters, and/or the like), and/or the like. For the purpose of illustration and not limitation, exemplary graphical user interfaces according to implementations of non-limiting embodiments or aspects of the process 300 are further discussed with reference to FIGS. 4-9 below.

In some non-limiting embodiments or aspects, a probability and/or weight of each potential outcome may be inversely related to the distance from the position of the icon to a respective edge of the at least three edges. For example, when the icon is centered, the distance to all three edges may be equal, and the potential outcomes (e.g., the probability thereof and/or the weighting thereof) may be balanced. Additionally or alternatively, when the icon is centered, the potential outcomes (e.g., the probability and/or weighting thereof) may be closest to default levels/values (e.g., historical, industry standard, traditional predictive model, and/or the like levels/values). In some non-limiting embodiments or aspects, the weights may be percentages, the sum of which may be 100%. In some non-limiting embodiments or aspects, the weights may be fractions or decimals, the sum of which may be one. In some non-limiting embodiments or aspects, the rule(s) may include at least one parameter. For example, a value of the parameter(s) may be based on a distance from the position of the icon to each edge of the polygon.

In some non-limiting embodiments or aspects, a textual label may be displayed within the graphical user interface adjacent each edge of the polygon. For example, each textual label may be associated with the outcome/concept associated with a respective edge of the polygon. In some non-limiting embodiments or aspects, the label may include a name and/or identifier of the outcome/concept associated with the respective edge. Additionally or alternatively, the label may also include a value (e.g., numerical value, percentage, and/or the like) associated with the outcome/concept of the respective edge. For example, the value may be a probability, a relative probability, a weight, and/or the like. In some non-limiting embodiments or aspects, a first label may be associated with an outcome such as a rate of acceptance/approval (e.g., "Accept") and/or a concept such as (increasing) revenue (e.g., "Revenue"). Additionally or alternatively, a second label may be associated with an outcome such as a rate of rejection/denial (e.g., "Reject") and/or a concept such as (reducing) risk (e.g., "Risk"). Additionally or alternatively, a third label may be associated with an outcome such as a rate at which transactions are flagged or identified for further (e.g., manual or automated) review (e.g., "Review") and/or a concept such as (reducing) costs (e.g. "Cost"). Additionally or alternatively, a fourth label may be associated with an outcome such as challenging the transaction (e.g., "Challenge"), which, for example, may be by advanced fraud detection system (e.g., "AFDS"). Additionally or alternatively, a fifth label may be associated with an outcome such as guaranteeing the transaction (e.g., "Guarantee"), which may be by a chargeback (e.g., "CBG").

In some non-limiting embodiments or aspects, a legend may be displayed within the graphical user interface. In some non-limiting embodiments or aspects, the legend may include a list of the potential outcomes and a probability of each potential outcome. Additionally or alternatively, the legend may include a listing of various metrics and/or statistics regarding potential outcomes. In some non-limiting embodiments or aspects, the legend may be based on hypothetical future outcomes (e.g., based on historical averages and/or the like) associated with the current configuration of the rule(s) (e.g., the current position of the icon). Additionally or alternatively, the legend may be based on past outcomes or hypothetical past outcomes (e.g., outcomes that happened over a previous period or outcomes that would have happened if the current configuration of the rule(s) were applied to data for events from a previous period). In some non-limiting embodiments or aspects, the legend displays a subset of available metrics and/or statistics (e.g., a mini-replay). Additionally or alternatively, the user may select an option (e.g., by input, interaction with a graphical element, and/or the like) to view a whole/full of metrics and/or statistics (e.g., a full replay). In some non-limiting embodiments or aspects, the legend may include acceptance/approval rate (e.g., "Accept"), rejection/denial rate (e.g., "Reject"), further review rate (e.g., "Review"), chargeback rate (e.g., "Chargeback"), potential/estimate revenue (e.g., "Revenue"), potential costs (e.g. "DM & TP Cost"), rate at which events (e.g., transactions) are marked or flagged as suspicious (e.g., "Mark as Suspect"), rate at which third party data is consulted (e.g., "Third Party"), and/or the like. In some non-limiting embodiments or aspects, the legend may include a name and/or identifier of each metric and/or statistic displayed. Additionally or alternatively, the legend may also include a value (e.g., numerical value, percentage, and/or the like) associated with each metric and/or statistic.

In some non-limiting embodiments or aspects, the graphical user interface may include other graphical elements (e.g., buttons, checkboxes, dropdown menus, and/or the like). Additionally or alternatively, the user may select and/or interact with the graphical elements. For example, buttons for applying and/or canceling the user input (e.g., movement of the icon) may be displayed. Additionally or alternatively, a button (e.g., near the legend/mini-replay) may be displayed to allow the user to see additional information (e.g., full replay).

In some non-limiting embodiments or aspects, the graphical user interface may include a vertex between each pair of adjacent edges of the polygon. Additionally or alternatively, the vertices at the ends of each edge and the icon may define a triangular area associated with each edge. In some non-limiting embodiments or aspects, each triangular area may include a different color. The colors may be any suitable colors. For example, a first color (e.g., green) may be associated with a first potential outcome (e.g., accept/approve), a second color (e.g., red) may be associated with a second potential outcome (e.g., reject/deny), a third color (e.g., yellow) may be associated with a third potential outcome (e.g., review), etc. Additionally or alternatively, the color of each triangular area may brighten or dim based on the position of the icon. For example, the color of a respective triangular area may become brighter when the icon is positioned closer to the respective edge. Additionally or alternatively, the color of a respective triangular area may dim as the icon is positioned further from the respective edge. In some non-limiting embodiments or aspects, a line, arrow, and/or the like may connect each vertex with the icon. For example, each line, arrow, and/or the like may be a side of at least one triangular area (e.g., the boundary between adjacent triangular areas).

In some non-limiting embodiments or aspects, the polygon may represent one rule and/or model. For example, all edges may be associated with the same rule and/or model. In some non-limiting embodiments or aspects, the polygon may represent a plurality of rules and/or models. Additionally or alternatively, each edge may represent one or more of the plurality of rules and/or models. Additionally or alternatively, one or more of the plurality of rules and/or models may be associated with two or more edges of the polygon. For the purpose of illustration, in some non-limiting embodiments or aspects, the polygon may represent 90 models (and/or rules thereof), and each edge may represent 30 of such models (and/or rules thereof).

As shown in FIG. 3, at step 320, process 300 may include receiving input from the graphical user interface to move the icon (e.g., to a second position). For example, a user device (e.g., a device of merchant system 108) may receive the input via at least on input component (e.g., input component 210). In some non-limiting embodiments or aspects, the input may be any suitable input for the input component (e.g., a touch, a keystroke, a click of a button, a flip of a switch, a voice command, an image (or series thereof) captured by a camera, and/or the like). For the purpose of illustration, a user may drag and/or move the icon (e.g., to a second position). Additionally or alternatively, the user may select a position (e.g., second position) for the icon, may provide a numerical coordinate to which the icon should be moved, may provide a vector (e.g., a distance and/or direction) to move the icon, and/or the like. In some non-limiting embodiments or aspects, the user may input data regarding one or more desired outcomes (e.g., a desired probability of at least one of the desired outcomes, a ranking of desired outcomes, a desired metric related to one of the outcomes, and/or the like), and the graphical user interface may determine a position (e.g., second position) to which the icon may be moved to achieve the input.

In some non-limiting embodiments or aspects, the user may select from one or more configurations that are suggested, pre-built, and/or the like, and the icon may be moved automatically based on the selection. For example, the user may be prompted which outcomes, concepts, and/or the like, are desired and/or preferred (e.g., "Where do you want to focus?", "Decision allowed?", "Outcomes Allowed?", and/or the like.) Additionally or alternatively, the user may select (e.g., by interaction and/or input) options (e.g., Accept, Reject, Review, Accept/Review, Accept/Reject, Custom, and/or the like). Based on the selection, an associated configuration may be determined and/or the icon may automatically be moved. In some non-limiting embodiments or aspects, the user may disable (e.g., temporarily, permanently, and/or the like) one of the edges (e.g., by interaction, input, and/or the like). For example, a disabled edge may have its weight set to zero (e.g., 0%), and/or the color or a triangular area associated with the disabled edge may change color (e.g., change to gray). For the purpose of illustration, if a user (e.g., merchant) does not want to allow a certain outcome (e.g., no further review of transactions ("Review") because the merchant does not want to expend resources and/or hire/devote staff to such reviews), then that edge may be disabled. In some non-limiting embodiments or aspects, when one edge is disabled, the weighting of the other edges may be adjusted. In some non-limiting embodiments or aspects, an initial or default weighting of the other edges (e.g., after an edge is disabled) may be set to be equal. For example, if there are three edges, and one is disabled, the weighting of the other two edges may be set to 50%. In some non-limiting embodiments or aspects, the weighting of the other edges (e.g., after an edge is disabled) may be adjusted proportionately so that the relative balance between the other edges remains the same as before the disabling of the edge.

As shown in FIG. 3, at step 330, process 300 may include displaying the icon at a (second) position. For example, a user device (e.g., a device of merchant system 108) may display (e.g., by an output component 212) the graphical user interface with the icon at the (second) position within the polygon (e.g., based on the input). For the purpose of illustration, the icon may be displayed at the position (e.g., second position) to which the user dragged the icon.

As shown in FIG. 3, at step 340, process 300 may include determining a distance from the (second) position of the icon to each edge of the polygon. For example, the distance may be the distance from the icon to the center of each edge, the perpendicular distance from the icon to each edge, the minimum distance from the icon to each edge, and/or the like. In some non-limiting embodiments or aspects, the user device (e.g., a device of merchant system 108) may determine the distance from the (second) position of the icon to each edge of the polygon. In some non-limiting embodiments or aspects, a remote computer system (e.g., transaction service provider system 102) may determine the distance from the (second) position of the icon to each edge of the polygon (e.g., after communicating position data from the user device to the remote computer system, as described below).

In some non-limiting embodiments or aspects, the value displayed in association with each edge of the polygon may be updated based on the (second) position of the icon. For example, the probability and/or weight of each concept and/or potential outcome represented by the label may be inversely related to the distance from the position of the icon to a respective edge, as described herein. In some non-limiting embodiments or aspects, the value displayed in association with statistic and/or metric of the legend may be updated based on the (second) position of the icon.

As shown in FIG. 3, at step 345, process 300 may include communicating data associated with the position (e.g., second position) and/or adjustment of position of the icon. In some non-limiting embodiments or aspects, the user device (e.g., a device of merchant system 108) may transmit position data associated with the (second) position of the icon within the polygon (e.g., to the remote computer system). Additionally or alternatively, the remote computer system (e.g., transaction service provider system 102) may receive the position data associated with the (second) position of the icon within the polygon (e.g., as transmitted from the user device). In some non-limiting embodiments or aspects, adjustment data associated with the distance from the (second) position of the icon to each edge of the polygon may be transmitted (e.g., from the user device to the remote computer system after the user device has determined the distance, as described herein).

As shown in FIG. 3, at step 350, process 300 may include adjusting the rule(s). For example, the rule(s) may be adjusted based on the position (e.g., the second position) of the icon within the polygon and/or based on the distance from the icon (e.g., in the second position) to each edge of the polygon. In some non-limiting embodiments or aspects, after adjusting the at least one rule, a probability of each potential outcome may be inversely related to a distance from the (second) position of the icon to a respective edge of the polygon.

In some non-limiting embodiments or aspects, adjusting the rule(s) may include adjusting the value of the at least one parameter based on the position of the icon and/or the distance from the (second) position of the icon to each edge of the polygon. Additionally or alternatively, the probability of each potential outcome may be based at least partially on the value of the parameter(s). Additionally or alternatively, adjusting the rule(s) may include adjusting a setting, threshold, and/or the like of the rule(s) (and/or a predictive model associated therewith) based on the position of the icon and/or the distance from the (second) position of the icon to each edge of the polygon.

In some non-limiting embodiments or aspects, there may be a plurality of rules (e.g., all represented by the same polygon). Additionally or alternatively, adjusting the plurality of rules may include at least one of removing a rule from, adding a rule to, and/or changing at least one of the plurality of rules.

In some non-limiting embodiments or aspects, the rule(s) may be stored (e.g., completely, partially, and/or the like) on a remote computer system. Additionally or alternatively, adjusting the rule(s) may include communicating adjustment data (e.g., data associated with the second position of the icon, the distance from the second position of the icon to each edge of the polygon, and/or the like) to the remote computer system.

In some non-limiting embodiments or aspects, after adjusting the rule(s), the probability, weighting, and/or the like of each potential outcome may be affected/changed accordingly. For example, the probability, weighting, and/or the like of each potential outcome may be inversely related to the distance from the (second) position of the icon to the respective edge of the polygon. Additionally or alternatively, the values in the labels and/or the legend may be updated accordingly.

In some non-limiting embodiments or aspects, the color of each triangular area may change (e.g., increase, decrease, brighten, dim, darken, lighten, and/or the like) based on the (second) position. For example, the color brightness of each triangular area may be inversely related to the distance from the (second) position of the icon to the respective edge of the polygon. For the purpose of illustration, the brightness of the triangular area corresponding to the edge closest to the (second) position of the icon may be the greatest, and the brightness of the other triangular areas may be decreased (e.g., the area corresponding to the second closest edge having the second greatest brightness, and the area corresponding to the third closest edge having the third highest brightness, etc.).

As shown in FIG. 3, at step 360, process 300 may include applying the rule(s). In some non-limiting embodiments or aspects, the rule(s) may include a first rule, and the first rule may include generating a score. For example, at least one parameter of the first rule may include a first threshold and a second threshold greater than the first threshold. Additionally or alternatively, a first potential outcome of the first rule may be associated with the score being below the first threshold, a second potential outcome of the first rule may be associated with the score being between the first threshold and the second threshold, and a third potential outcome of the first rule may be associated with the score being above the second threshold.

In some non-limiting embodiments or aspects, the rule(s) may include rules for authorization of a transaction (e.g., a payment transaction). For example, transaction data associated with a plurality of payment transactions may be received (e.g., at the remote computer system). Additionally or alternatively, an outcome for each payment transaction may be determined (e.g., by the remote computer system) based on the rule(s). For example, the outcome for each payment transaction may include one of the potential outcomes of the at least one rule. For the purpose of illustration, if the potential outcomes include approving/accepting the transaction, denying/rejecting the transaction, and/or identifying the transaction for review, each transaction may be approved/accepted, denied/rejected, and/or identified for review (e.g., by the remote computer system) based on the rules.

Figure 4:
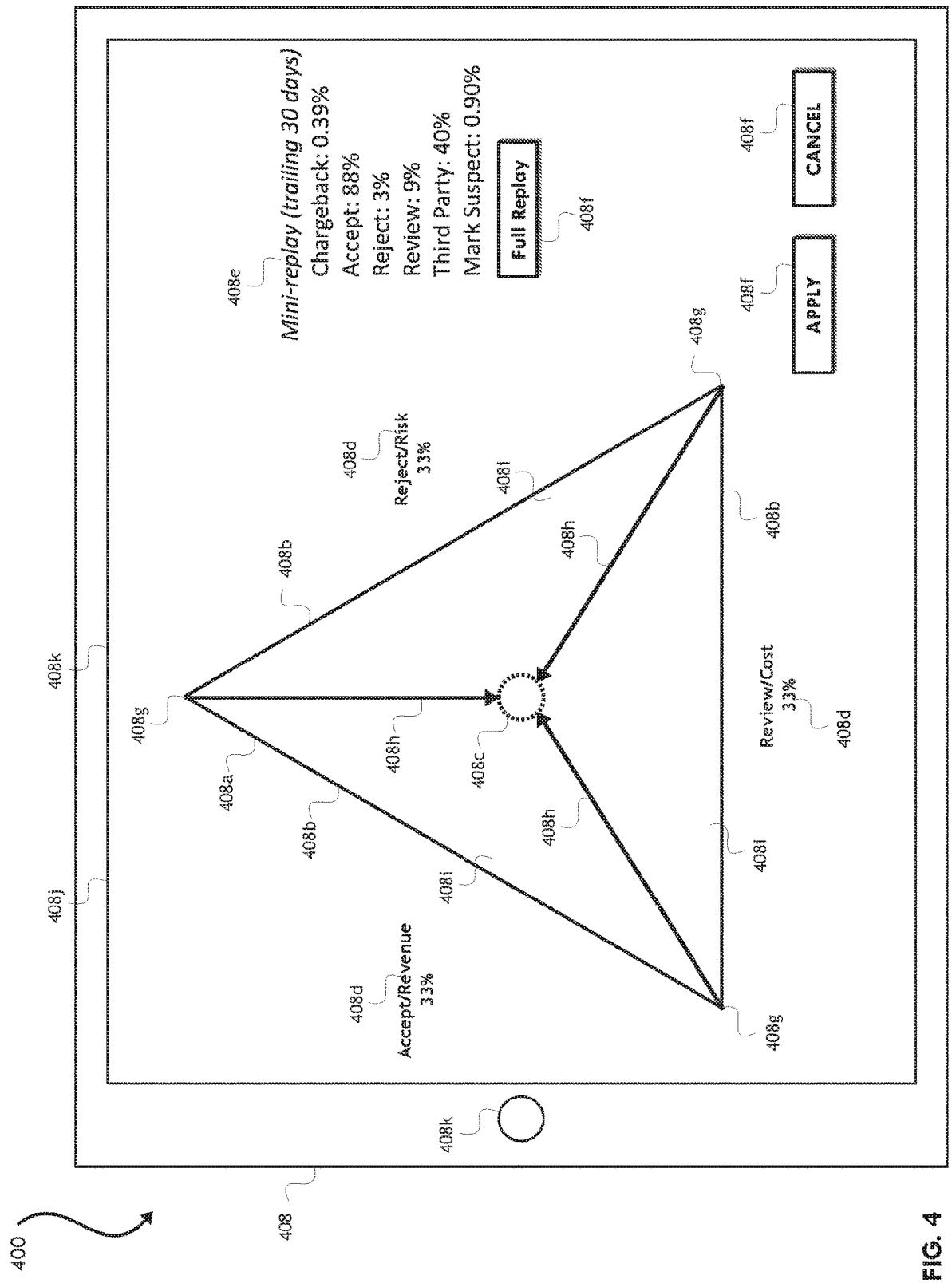
FIG. 4 is a diagram of some non-limiting embodiments or aspects of a graphical user interface according to an implementation of some non-limiting embodiments or aspects of the process shown in FIG. 3.

Referring now to FIG. 4, FIG. 4 is a diagram of an exemplary graphical user interface according to an implementation 400 of some non-limiting embodiments or aspects relating to process 300 shown in FIG. 3. As shown in FIG. 4, implementation 400 may include user device 408. In some non-limiting embodiments or aspects, with reference to FIG. 4, user device 408 may be the same as or similar to one or more devices of merchant system 108. Additionally or alternatively, user device 408 may be implemented (e.g., completely, partially, and/or the like) by another system, another device, another group of systems, or another group of devices, separate from or including merchant system 108, such as transaction service provider system 102 (e.g., one or more devices of transaction service provider system 102), issuer system 104 (e.g., one or more devices of issuer system 104), customer device 106, and/or acquirer system 110 (e.g., one or more devices of acquirer system 110). In some non-limiting embodiments or aspects, a remote computer system (not shown) may be in communication with user device 408. For example, the remote computer system may be the same as or similar to one or more devices of transaction service provider system 102. Additionally or alternatively, the remote computer system may be implemented (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

In some non-limiting embodiments or aspects, user device 408 may have at least one output component 408j. For example, output component(s) 408j may be the same as or similar to output component 212. Additionally or alternatively, for the purpose of illustration, output component(s) 408j may include a display. In some non-limiting embodiments or aspects, user device 408 may have at least one input component 408k. For example, input component(s) 408k may be the same as or similar to input component 210. Additionally or alternatively, for the purpose of illustration, input component(s) 408k may include a touchscreen display (or other pointing device such as a mouse), a button, and/or the like.

In some non-limiting embodiments or aspects, user device 408 may display (e.g., using output component 408j) a graphical user interface. For example, the graphical user interface may include a polygon 408a (e.g., a triangle), as described herein. For example, the polygon 408a may have at least three edges 408b (e.g., three edges 408b), as described herein. In some non-limiting embodiments or aspects, an icon 408c may be at a position (e.g., first position) within the polygon 408a, as described herein. For example, the (first) position may be an initial or default position, as described herein. Additionally or alternatively, the (first) position may be selected based on input of the user, may be a position where the user previously moved the icon, may be a representation of a previous/current state of the rules (e.g., based on previous/current settings, parameters, and/or the like), and/or the like, as described herein.

In some non-limiting embodiments or aspects, the polygon 408a may have vertices 408g between each pair of adjacent edges of the polygon, as described herein. Additionally or alternatively, the vertices 408g at the ends of each edge 408b and the icon 408c may define a triangular area 408i associated with each edge 408b, as described herein. In some non-limiting embodiments or aspects, each triangular area 408i may include a different color, as described herein. Additionally or alternatively, the graphical user interface may include a line/arrow 408h connecting each vertex 408g to the icon 408c, as described herein. For example, each line/arrow 408h may be a side of at least one triangular area 408i, as described herein.

In some non-limiting embodiments or aspects, the graphical user interface may include a textual label 408d associated with each edge 408b of the polygon 408a, as described herein. Additionally or alternatively, the graphical user interface may include a legend 408e, as described herein. In some non-limiting embodiments or aspects, the graphical user interface may include additional graphical elements (e.g., buttons, checkboxes, dropdown menus, and/or the like) for input, as described herein. For example, the graphical user interface may include buttons 408f (e.g., for applying and/or canceling the user input, for displaying the full statistics/metrics information, and/or the like), as described herein.

In some non-limiting embodiments or aspects, each section (e.g., triangular area 408i) of the polygon 408a may represent a pillar (e.g., potential outcome and/or concept) of a balanced fraud management approach. In some non-limiting embodiments or aspects, the (first) position of the icon 408c may be a default position (e.g., a "balanced" approach), and the icon may be equidistant from each edge 408b of the polygon 408a. For example, with the icon 408c in such a position, the weighting for each potential outcome (e.g., as represented by each edge) may be equal (e.g., 33.33%, if the polygon 408a is a triangle). Additionally or alternatively, the sum of the weights (e.g., expressed in percentages or fractions/decimals) may sum to a predetermined amount (e.g., 100% for percentages or 1 for fractions/decimals). In some non-limiting embodiments or aspects, the weighting of each potential outcome (e.g., corresponding to each edge 408b) may be displayed in a corresponding label 408d. Additionally or alternatively, the legend 408e may display statistics, metrics, and/or the like (e.g., associated with a predicted/estimated performance, predicted/estimated outcomes, and/or the like, as described herein) based on the position of the icon 408c, as described herein. In some non-limiting embodiments or aspects, if a user moves the icon 408c (e.g., by interaction and/or input with the user device 408, such as dragging the icon 408c), the weighting of each edge 408b and the predicted/estimated statistics, metrics, and/or the like in the legend 408e may change, as described herein.

Figure 5:
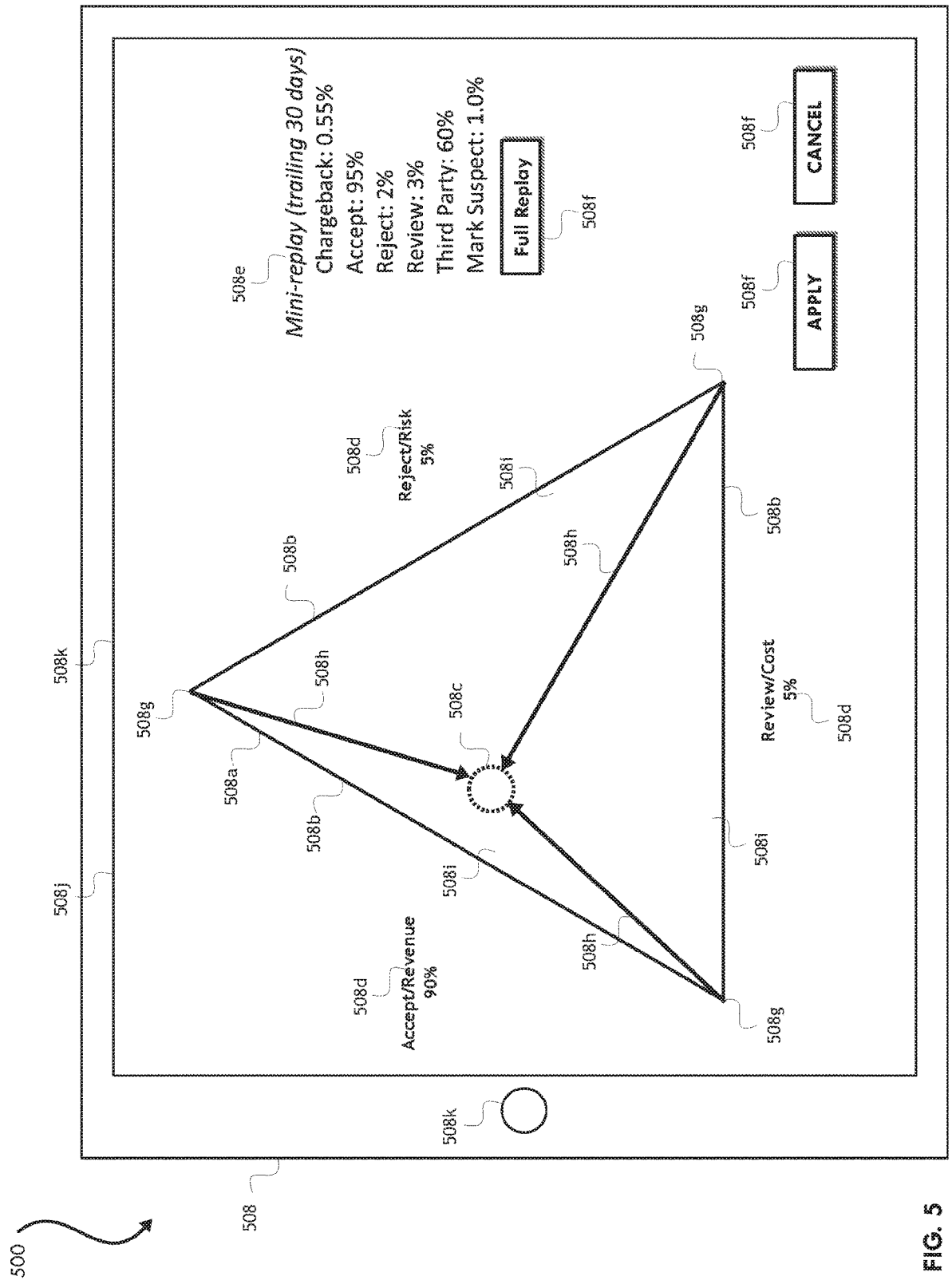
FIG. 5 is a diagram of some non-limiting embodiments or aspects of a graphical user interface according to an implementation of some non-limiting embodiments or aspects of the process shown in FIG. 3.

Referring now to FIG. 5, FIG. 5 is a diagram of an exemplary graphical user interface according to an implementation 500 of some non-limiting embodiments or aspects relating to process 300 shown in FIG. 3. As shown in FIG. 5, implementation 500 may include user device 508. In some non-limiting embodiments or aspects, user device 508 may be the same as or similar to user device 408. In some non-limiting embodiments or aspects, with reference to FIG. 5, user device 508 may be the same as or similar to one or more devices of merchant system 108. Additionally or alternatively, user device 508 may be implemented (e.g., completely, partially, and/or the like) by another system, another device, another group of systems, or another group of devices, separate from or including merchant system 108, such as transaction service provider system 102 (e.g., one or more devices of transaction service provider system 102), issuer system 104 (e.g., one or more devices of issuer system 104), customer device 106, and/or acquirer system 110 (e.g., one or more devices of acquirer system 110). In some non-limiting embodiments or aspects, a remote computer system (not shown) may be in communication with user device 508. For example, the remote computer system may be the same as or similar to one or more devices of transaction service provider system 102. Additionally or alternatively, the remote computer system may be implemented (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

In some non-limiting embodiments or aspects, user device 508 may have at least one output component 508j. In some non-limiting embodiments or aspects, output component 508j may be the same as or similar to output component 408j. In some non-limiting embodiments or aspects, output component(s) 508j may be the same as or similar to output component 212. Additionally or alternatively, for the purpose of illustration, output component(s) 508j may include a display. In some non-limiting embodiments or aspects, user device 508 may have at least one input component 508k. In some non-limiting embodiments or aspects, input component(s) 508k may be the same as or similar to input component(s) 408k. In some non-limiting embodiments or aspects, input component(s) 508k may be the same as or similar to input component 210. Additionally or alternatively, for the purpose of illustration, input component(s) 508k may include a touchscreen display (or other pointing device such as a mouse), a button, and/or the like.

In some non-limiting embodiments or aspects, user device 508 may display (e.g., using output component 508j) a graphical user interface. For example, the graphical user interface may include a polygon 508a (e.g., a triangle), as described herein. For example, the polygon 508a may have at least three edges 508b (e.g., three edges 508b), as described herein. In some non-limiting embodiments or aspects, an icon 508c may be at a position (e.g., second position) within the polygon 508a, as described herein. For example, the (second) position may be a position to which the user has dragged the icon 508c, as described herein. Additionally or alternatively, the (second) position may be based on input of the user, may be a position where the user moved the icon, may be a representation of a current state of the rules (e.g., based on current settings, parameters, and/or the like), and/or the like, as described herein.

In some non-limiting embodiments or aspects, the polygon 508a may have vertices 508g between each pair of adjacent edges of the polygon, as described herein. Additionally or alternatively, the vertices 508g at the ends of each edge 508b and the icon 508c may define a triangular area 508i associated with each edge 508b, as described herein. In some non-limiting embodiments or aspects, each triangular area 508i may include a different color, as described herein. Additionally or alternatively, the brightness of each color may be based on (e.g., inversely related to) the distance from the icon 508c to each edge 508b of the polygon 508a, as described herein. In some non-limiting embodiments or aspects, the graphical user interface may include a line/arrow 508h connecting each vertex 508g to the icon 508c, as described herein. For example, each line/arrow 508h may be a side of at least one triangular area 508i, as described herein.

In some non-limiting embodiments or aspects, the graphical user interface may include a textual label 508d associated with each edge 508b of the polygon 508a, as described herein. Additionally or alternatively, the graphical user interface may include a legend 508e, as described herein. In some non-limiting embodiments or aspects, the graphical user interface may include additional graphical elements (e.g., buttons, checkboxes, dropdown menus, and/or the like) for input, as described herein. For example, the graphical user interface may include buttons 508f (e.g., for applying and/or canceling the user input, for displaying the full statistics/metrics information, and/or the like), as described herein.

In some non-limiting embodiments or aspects, each section (e.g., triangular area 508i) of the polygon 508a may represent a pillar (e.g., potential outcome and/or concept) of a balanced fraud management approach. In some non-limiting embodiments or aspects, based on user input (e.g., moving and/or dragging the icon), the icon 508c may be in a position (e.g., a second position). For the purpose of illustration, the icon 508c may be positioned (e.g., at the second position) closest to a first edge 508b (e.g., the edge 508b associated with the outcome/concept of Accept/Revenue). Additionally or alternatively, the weighting of the potential outcome/concept represented by the (first) edge 508b (e.g., Accept/Revenue) may be changed based on the position of the icon 508c (e.g., increase its weight to 90%, increase its rate based on the distance from the icon 508c to the respective edge 508b, and/or the like). Additionally or alternatively, the weighting of the other potential outcomes/concepts represented by other edges 508b (e.g., second edge 508b associated with Reject/Risk and/or third edge 508b associated with Review/Cost) may be changed based on the position of the icon 508c (e.g., decrease the weight of each to 5%, decrease the rate of each based on the distance from the icon 508c to the respective edge 508b, and/or the like). Additionally or alternatively, the sum of the weights (e.g., expressed in percentages or fractions/decimals) may sum to a predetermined amount (e.g., 100% for percentages or 1 for fractions/decimals).

In some non-limiting embodiments or aspects, the brightness of the color of each triangular area 508i may be based on (e.g., inversely related to) the distance from the icon 508c to each edge 508b of the polygon 508a, as described herein. For example, the brightness of a triangular area 508i associated with the (first) edge 508b closest to the icon may have the greatest brightness (e.g., maximum brightness, brightness relatively higher than the other triangular areas 508i, and/or the like). Additionally or alternatively, the other triangular areas 508i (e.g., associated with second and third edges 508b) may be dimmed and/or have decreased brightness (e.g., brightness relatively lower than the first triangular area 508i, brightness decreased proportionate to the distance from the icon 508c to the respective edge). For the purpose of illustration, when the icon 508c is closest to the first edge 508b (e.g., Accept/Revenue) and the distance from the icon 508c to the other (second and third) edges (e.g., Reject/Risk and Review/Cost, respectively) is about equal, the first triangular area 508i corresponding to the closest edge 508b (e.g., first edge) may have a first brightness and the other triangular areas 508i may have a second brightness less than the first brightness.

In some non-limiting embodiments or aspects, after adjusting the rule(s) based on the position of the icon 508c, the probability, weighting, and/or the like of each potential outcome may be affected/changed accordingly. For example, the probability, weighting, and/or the like of each potential outcome/concept associated with each edge 508b may be inversely related to the distance from the (second) position of the icon 508c to the respective edge 508b of the polygon 508a. Additionally or alternatively, the values in the labels 508d and/or the legend 508e may be updated accordingly. For the purpose of illustration, if the icon 508c is closest to the (first) edge 508b (e.g., Accept/Revenue), the rate of approval/acceptance may increase, the rate of denial/rejection may decrease, the rate of identifying transactions for review may decrease, usage of third party data may increase, and/or the rate of marking transactions as suspicions may increase.

For the purpose of illustration, some merchants may be less sensitive to fraud than others. For example, a merchant with relatively high margins, relatively low costs, and/or relatively high sales volume (e.g., a software vendor) may be relatively less sensitive to fraud (e.g., occasional fraudulent transaction) and/or may prefer to approve a relatively greater proportion of transactions quickly (e.g., increase Accept/Revenue weighting) while limiting rejection and/or review of transactions (and thereby reducing costs associated therewith). Accordingly, such user of such a merchant may elect to move the icon 508c towards the edge 508b with the label 508d for Accept/Revenue. For the purpose of illustration, the merchant may find it suitable to take on increased potential risk in order to accept/approve more transactions.

Figure 6:
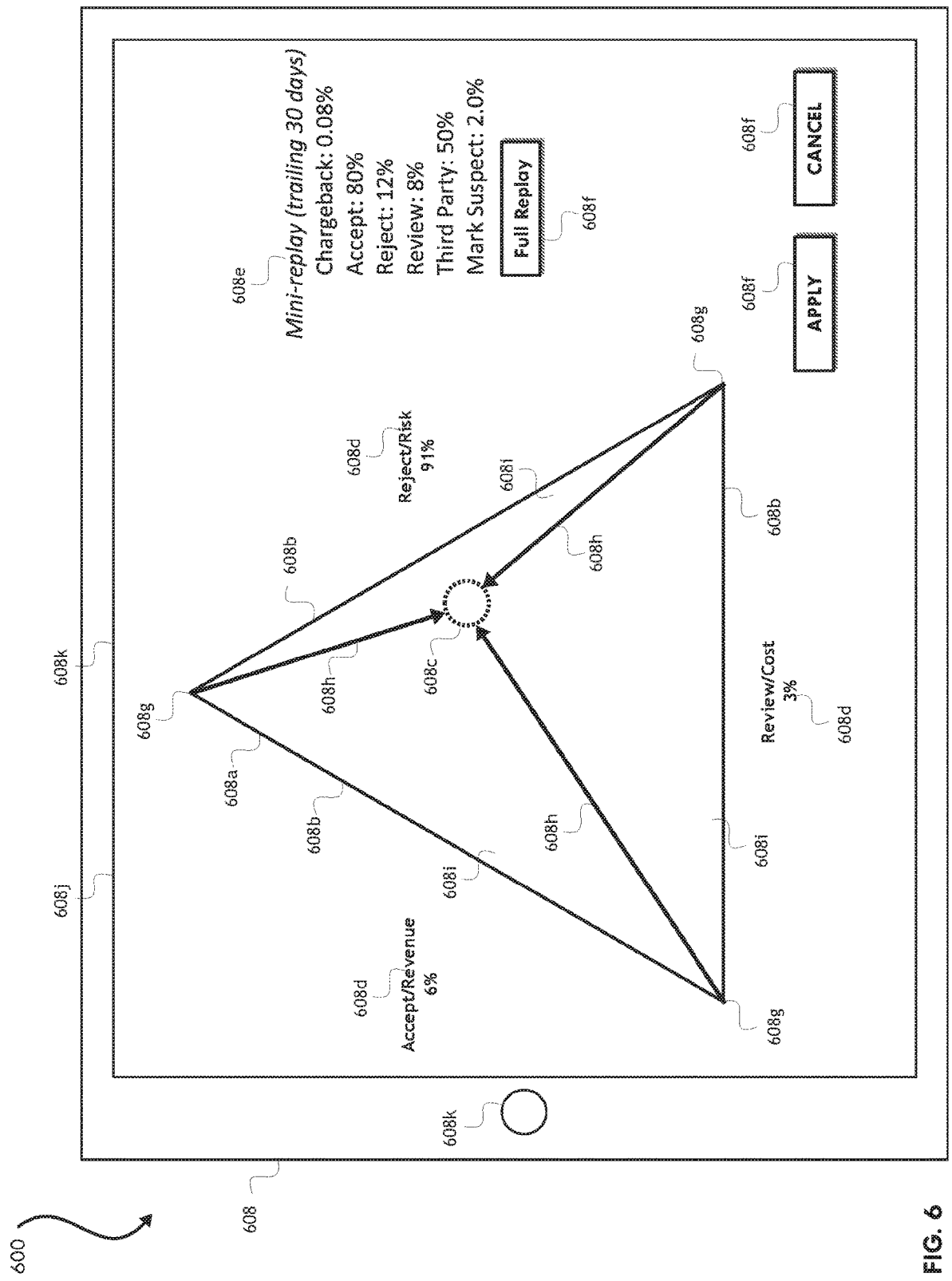
FIG. 6 is a diagram of some non-limiting embodiments or aspects of a graphical user interface according to an implementation of some non-limiting embodiments or aspects of the process shown in FIG. 3.

Referring now to FIG. 6, FIG. 6 is a diagram of an exemplary graphical user interface according to an implementation 600 of some non-limiting embodiments or aspects relating to process 300 shown in FIG. 3. As shown in FIG. 6, implementation 600 may include user device 608. In some non-limiting embodiments or aspects, user device 608 may be the same as or similar to user device 408 and/or 508. In some non-limiting embodiments or aspects, with reference to FIG. 6, user device 608 may be the same as or similar to one or more devices of merchant system 108. Additionally or alternatively, user device 608 may be implemented (e.g., completely, partially, and/or the like) by another system, another device, another group of systems, or another group of devices, separate from or including merchant system 108, such as transaction service provider system 102 (e.g., one or more devices of transaction service provider system 102), issuer system 104 (e.g., one or more devices of issuer system 104), customer device 106, and/or acquirer system 110 (e.g., one or more devices of acquirer system 110). In some non-limiting embodiments or aspects, a remote computer system (not shown) may be in communication with user device 608. For example, the remote computer system may be the same as or similar to one or more devices of transaction service provider system 102. Additionally or alternatively, the remote computer system may be implemented (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

In some non-limiting embodiments or aspects, user device 608 may have at least one output component 608j. In some non-limiting embodiments or aspects, output component 608j may be the same as or similar to output component 408j and/or 508j. In some non-limiting embodiments or aspects, output component(s) 608j may be the same as or similar to output component 212. Additionally or alternatively, for the purpose of illustration, output component(s) 608j may include a display. In some non-limiting embodiments or aspects, user device 608 may have at least one input component 608k. In some non-limiting embodiments or aspects, input component(s) 608k may be the same as or similar to input component(s) 408k and/or 508k. In some non-limiting embodiments or aspects, input component(s) 608k may be the same as or similar to input component 210. Additionally or alternatively, for the purpose of illustration, input component(s) 608k may include a touchscreen display (or other pointing device such as a mouse), a button, and/or the like.

In some non-limiting embodiments or aspects, user device 608 may display (e.g., using output component 608j) a graphical user interface. For example, the graphical user interface may include a polygon 608a (e.g., a triangle), as described herein. For example, the polygon 608a may have at least three edges 608b (e.g., three edges 608b), as described herein. In some non-limiting embodiments or aspects, an icon 608c may be at a position (e.g., third position) within the polygon 608a, as described herein. For example, the (third) position may be a position to which the user has dragged the icon 608c, as described herein. Additionally or alternatively, the (third) position may be based on input of the user, may be a position where the user moved the icon, may be a representation of a current state of the rules (e.g., based on current settings, parameters, and/or the like), and/or the like, as described herein.

In some non-limiting embodiments or aspects, the polygon 608a may have vertices 608g between each pair of adjacent edges of the polygon, as described herein. Additionally or alternatively, the vertices 608g at the ends of each edge 608b and the icon 608c may define a triangular area 608i associated with each edge 608b, as described herein. In some non-limiting embodiments or aspects, each triangular area 608i may include a different color, as described herein. Additionally or alternatively, the brightness of each color may be based on (e.g., inversely related to) the distance from the icon 608c to each edge 608b of the polygon 608a, as described herein. In some non-limiting embodiments or aspects, the graphical user interface may include a line/ arrow 608h connecting each vertex 608g to the icon 608c, as described herein. For example, each line/arrow 608h may be a side of at least one triangular area 608i, as described herein.

In some non-limiting embodiments or aspects, the graphical user interface may include a textual label 608d associated with each edge 608b of the polygon 608a, as described herein. Additionally or alternatively, the graphical user interface may include a legend 608e, as described herein. In some non-limiting embodiments or aspects, the graphical user interface may include additional graphical elements (e.g., buttons, checkboxes, dropdown menus, and/or the like) for input, as described herein. For example, the graphical user interface may include buttons 608f (e.g., for applying and/or canceling the user input, for displaying the full statistics/metrics information, and/or the like), as described herein.

In some non-limiting embodiments or aspects, each section (e.g., triangular area 608i) of the polygon 608a may represent a pillar (e.g., potential outcome and/or concept) of a balanced fraud management approach. In some non-limiting embodiments or aspects, based on user input (e.g., moving and/or dragging the icon), the icon 608c may be in a position (e.g., a third position and/or the like). For the purpose of illustration, the icon 608c may be positioned (e.g., at the third position) closest to a second edge 608b (e.g., the edge 608b associated with the outcome/concept of Reject/Risk). Additionally or alternatively, the weighting of the potential outcome/concept represented by the (second) edge 608b (e.g., Reject/Risk) may be changed based on the position of the icon 608c (e.g., increase its weight to 91%, increase its rate based on the distance from the icon 608c to the respective edge 608b, and/or the like). Additionally or alternatively, the weighting of the other potential outcomes/concepts represented by other edges 608b (e.g., first edge 608b associated with Accept/Revenue and/or third edge 608b associated with Review/Cost) may be changed based on the position of the icon 608c (e.g., decrease the weight of the first edge to 6% and the third edge to 3%, decrease the rate of each based on the distance from the icon 608c to the respective edge 608b, and/or the like). Additionally or alternatively, the sum of the weights (e.g., expressed in percentages or fractions/decimals) may sum to a predetermined amount (e.g., 100% for percentages or 1 for fractions/decimals).

In some non-limiting embodiments or aspects, the brightness of the color of each triangular area 608i may be based on (e.g., inversely related to) the distance from the icon 608c to each edge 608b of the polygon 608a, as described herein. For example, the brightness of a triangular area 608i associated with the (second) edge 608b closest to the icon may have the greatest brightness (e.g., maximum brightness, brightness relatively higher than the other triangular areas 608i, and/or the like). Additionally or alternatively, the other triangular areas 608i (e.g., associated with first and third edges 608b) may be dimmed and/or have decreased brightness (e.g., brightness relatively lower than the first triangular area 608i, brightness decreased proportionate to the distance from the icon 608c to the respective edge). For the purpose of illustration, when the icon 608c is closest to the second edge 608b (e.g., Reject/Risk) and the distance from the icon 608c to the first edge (e.g., Accept/Revenue) is greater than the distance to the second edge 608b, and the distance from the icon 608c to the third edge 608b (e.g., Review/Cost) is greater than the distance to the first edge 608b, the second triangular area 608i corresponding to the closest edge 608b (e.g., second edge) may have a second brightness, the first triangular area 608i corresponding to the second-closest edge 608b (e.g., first edge) may have a first brightness less than the second brightness, and the third triangular area 608i corresponding to the farthest edge 608b (e.g., third edge) may have a third brightness less than the first brightness.

In some non-limiting embodiments or aspects, after adjusting the rule(s) based on the position of the icon 608c, the probability, weighting, and/or the like of each potential outcome may be affected/changed accordingly. For example, the probability, weighting, and/or the like of each potential outcome/concept associated with each edge 608b may be inversely related to the distance from the (third) position of the icon 608c to the respective edge 608b of the polygon 608a. Additionally or alternatively, the values in the labels 608d and/or the legend 608e may be updated accordingly. For the purpose of illustration, if the icon 608c is closest to the (second) edge 608b (e.g., Reject/Risk), the rate of denial/rejection may increase, the rate of approval/acceptance may decrease, the rate of identifying transactions for review may change (e.g., increase compared to the first position and decrease compared to the second position), usage of third party data may change (e.g., increase compared to the first position and decrease compared to the second position), and/or the rate of marking transactions as suspicions may increase.

For the purpose of illustration, some merchants may be more sensitive to fraud than others. For example, a merchant with relatively low margins, relatively high costs, and/or relatively low sales volume (e.g., a jeweler) may be relatively more sensitive to fraud (e.g., each fraudulent transaction includes a significant direct cost) and/or may prefer to reject a relatively greater proportion of transactions quickly (e.g., increase Reject/Risk weighting) while limiting approval/acceptance and/or review of transactions (and thereby reducing costs/risks associated therewith). Accordingly, such a merchant may elect to move the icon 608c towards the edge 608b with the label 608d for Reject/Risk. For the purpose of illustration, the merchant may find it suitable to deny/reject more transactions in order to reduce potential risk.

Figure 7:
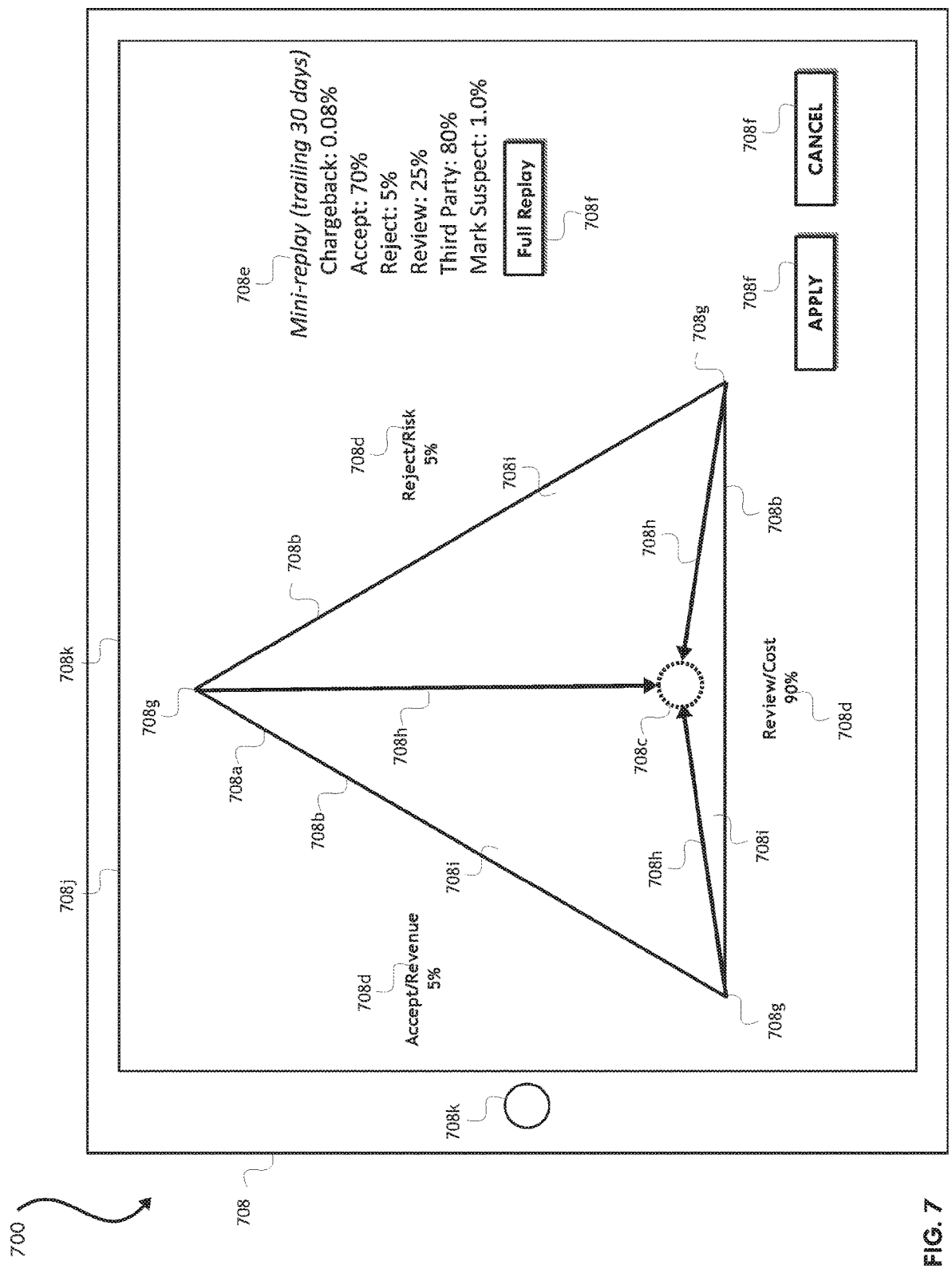
FIG. 7 is a diagram of some non-limiting embodiments or aspects of a graphical user interface according to an implementation of some non-limiting embodiments or aspects of the process shown in FIG. 3.

Referring now to FIG. 7, FIG. 7 is a diagram of an exemplary graphical user interface according to an implementation 700 of some non-limiting embodiments or aspects relating to process 300 shown in FIG. 3. As shown in FIG. 7, implementation 700 may include user device 708. In some non-limiting embodiments or aspects, user device 708 may be the same as or similar to user device 408, 508, and/or 608. In some non-limiting embodiments or aspects, with reference to FIG. 7, user device 708 may be the same as or similar to one or more devices of merchant system 108. Additionally or alternatively, user device 708 may be implemented (e.g., completely, partially, and/or the like) by another system, another device, another group of systems, or another group of devices, separate from or including merchant system 108, such as transaction service provider system 102 (e.g., one or more devices of transaction service provider system 102), issuer system 104 (e.g., one or more devices of issuer system 104), customer device 106, and/or acquirer system 110 (e.g., one or more devices of acquirer system 110). In some non-limiting embodiments or aspects, a remote computer system (not shown) may be in communication with user device 708. For example, the remote computer system may be the same as or similar to one or more devices of transaction service provider system 102. Additionally or alternatively, the remote computer system may be implemented (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

In some non-limiting embodiments or aspects, user device 708 may have at least one output component 708*j*. In some non-limiting embodiments or aspects, output component 708*j* may be the same as or similar to output component 408*j*, 508*j*, and/or 608*j*. In some non-limiting embodiments or aspects, output component(s) 708*j* may be the same as or similar to output component 212. Additionally or alternatively, for the purpose of illustration, output component(s) 708*j* may include a display. In some non-limiting embodiments or aspects, user device 708 may have at least one input component 708*k*. In some non-limiting embodiments or aspects, input component(s) 708*k* may be the same as or similar to input component(s) 408*k*, 508*k*, and/or 608*k*. In some non-limiting embodiments or aspects, input component(s) 708*k* may be the same as or similar to input component 210. Additionally or alternatively, for the purpose of illustration, input component(s) 708*k* may include a touchscreen display (or other pointing device such as a mouse), a button, and/or the like.

In some non-limiting embodiments or aspects, user device 708 may display (e.g., using output component 708*j*) a graphical user interface. For example, the graphical user interface may include a polygon 708*a* (e.g., a triangle), as described herein. For example, the polygon 708*a* may have at least three edges 708*b* (e.g., three edges 708*b*), as described herein. In some non-limiting embodiments or aspects, an icon 708*c* may be at a position (e.g., fourth position) within the polygon 708*a*, as described herein. For example, the (fourth) position may be a position to which the user has dragged the icon 708*c*, as described herein. Additionally or alternatively, the (fourth) position may be based on input of the user, may be a position where the user moved the icon, may be a representation of a current state of the rules (e.g., based on current settings, parameters, and/or the like), and/or the like, as described herein.

In some non-limiting embodiments or aspects, the polygon 708*a* may have vertices 708*g* between each pair of adjacent edges of the polygon, as described herein. Additionally or alternatively, the vertices 708*g* at the ends of each edge 708*b* and the icon 708*c* may define a triangular area 708*i* associated with each edge 708*b*, as described herein. In some non-limiting embodiments or aspects, each triangular area 708*i* may include a different color, as described herein. Additionally or alternatively, the brightness of each color may be based on (e.g., inversely related to) the distance from the icon 708*c* to each edge 708*b* of the polygon 708*a*, as described herein. In some non-limiting embodiments or aspects, the graphical user interface may include a line/arrow 708*h* connecting each vertex 708*g* to the icon 708*c*, as described herein. For example, each line/arrow 708*h* may be a side of at least one triangular area 708*i*, as described herein.

In some non-limiting embodiments or aspects, the graphical user interface may include a textual label 708*d* associated with each edge 708*b* of the polygon 708*a*, as described herein. Additionally or alternatively, the graphical user interface may include a legend 708*e*, as described herein. In some non-limiting embodiments or aspects, the graphical user interface may include additional graphical elements (e.g., buttons, checkboxes, dropdown menus, and/or the like) for input, as described herein. For example, the graphical user interface may include buttons 708*f* (e.g., for applying and/or canceling the user input, for displaying the full statistics/metrics information, and/or the like), as described herein.

In some non-limiting embodiments or aspects, each section (e.g., triangular area 708*i*) of the polygon 708*a* may represent a pillar (e.g., potential outcome and/or concept) of a balanced fraud management approach. In some non-limiting embodiments or aspects, based on user input (e.g., moving and/or dragging the icon), the icon 708*c* may be in a position (e.g., a fourth position and/or the like). For the purpose of illustration, the icon 708*c* may be positioned (e.g., at the fourth position) closest to a third edge 708*b* (e.g., the edge 708*b* associated with the outcome/concept of Review/Cost). Additionally or alternatively, the weighting of the potential outcome/concept represented by the (third) edge 708*b* (e.g., Reject/Risk) may be changed based on the position of the icon 708*c* (e.g., increase its weight to 90%, increase its rate based on the distance from the icon 708*c* to the respective edge 708*b*, and/or the like). Additionally or alternatively, the weighting of the other potential outcomes/concepts represented by other edges 708*b* (e.g., first edge 708*b* associated with Accept/Revenue and/or second edge 708*b* associated with Reject/Risk) may be changed based on the position of the icon 708*c* (e.g., decrease the weight of the first edge to 5% and the second edge to 5%, decrease the rate of each based on the distance from the icon 708*c* to the respective edge 708*b*, and/or the like). Additionally or alternatively, the sum of the weights (e.g., expressed in percentages or fractions/decimals) may sum to a predetermined amount (e.g., 100% for percentages or 1 for fractions/decimals).

In some non-limiting embodiments or aspects, the brightness of the color of each triangular area 708*i* may be based on (e.g., inversely related to) the distance from the icon 708*c* to each edge 708*b* of the polygon 708*a*, as described herein. For example, the brightness of a triangular area 708*i* associated with the (third) edge 708*b* closest to the icon may have the greatest brightness (e.g., maximum brightness, brightness relatively higher than the other triangular areas 708*i*, and/or the like). Additionally or alternatively, the other triangular areas 708*i* (e.g., associated with first and second edges 708*b*) may be dimmed and/or have decreased brightness (e.g., brightness relatively lower than the first triangular area 708*i*, brightness decreased proportionate to the distance from the icon 708*c* to the respective edge). For the purpose of illustration, when the icon 708*c* is closest to the third edge 708*b* (e.g., Review/Cost) and the distance from the icon 708*c* to the other (first and second) edges (e.g., Accept/Revenue and Reject/Risk, respectively) is about equal, the third triangular area 708*i* corresponding to the closest edge 708*b* (e.g., third edge) may have a first brightness and the other triangular areas 708*i* may have a second brightness less than the first brightness.

In some non-limiting embodiments or aspects, after adjusting the rule(s) based on the position of the icon 708*c*, the probability, weighting, and/or the like of each potential outcome may be affected/changed accordingly. For example, the probability, weighting, and/or the like of each potential outcome/concept associated with each edge 708*b* may be inversely related to the distance from the (fourth) position of the icon 708*c* to the respective edge 708*b* of the polygon 708*a*. Additionally or alternatively, the values in the labels 708*d* and/or the legend 708*e* may be updated accordingly. For the purpose of illustration, if the icon 708*c* is closest to the third edge 708*b* (e.g., Review/Cost), the rate of identifying transactions for review may increase, the rate of approval/acceptance may decrease, the rate of denial/rejection may change (e.g., increase compared to the first and second positions and decrease compared to the third position), usage of third party data may increase, and/or the rate of marking transactions as suspicions may change (e.g., increase compared to the first position, decrease compared to the third position, and/or be the same as the second position).

For the purpose of illustration, some merchants may be more sensitive to fraud than others and/or have more resources available (e.g., personnel, computing resources, monetary budget, and/or the like) to review potentially fraudulent transactions. For example, such a merchant may want to avoid the risk of fraudulent charges and/or improve security and/or customer experience by investigating potentially fraudulent charges. Accordingly, such a merchant may elect to move the icon 708c towards the edge 708b with the label 708d for Review/Cost. For the purpose of illustration, the merchant may find it suitable to review and/or deny/reject more transactions in order to reduce potential risk.

Figure 8:
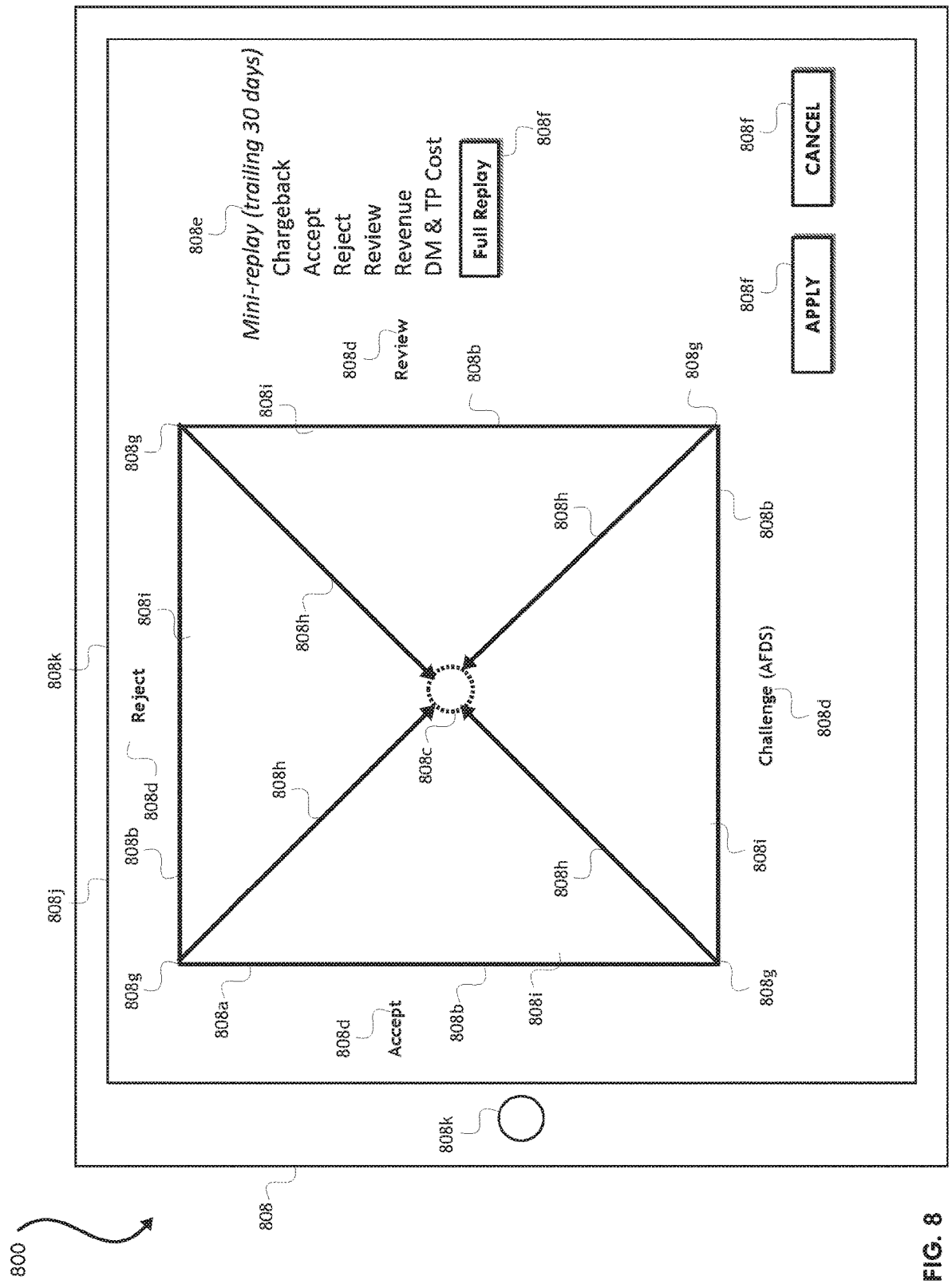
FIG. 8 is a diagram of some non-limiting embodiments or aspects of a graphical user interface according to an implementation of some non-limiting embodiments or aspects of the process shown in FIG. 3.

Referring now to FIG. 8, FIG. 8 is a diagram of an exemplary graphical user interface according to an implementation 800 of some non-limiting embodiments or aspects relating to process 300 shown in FIG. 3. As shown in FIG. 8, implementation 800 may include user device 808. In some non-limiting embodiments or aspects, user device 808 may be the same as or similar to user device 408, 508, 608, and/or 708. In some non-limiting embodiments or aspects, with reference to FIG. 4, user device 808 may be the same as or similar to one or more devices of merchant system 108. Additionally or alternatively, user device 808 may be implemented (e.g., completely, partially, and/or the like) by another system, another device, another group of systems, or another group of devices, separate from or including merchant system 108, such as transaction service provider system 102 (e.g., one or more devices of transaction service provider system 102), issuer system 104 (e.g., one or more devices of issuer system 104), customer device 106, and/or acquirer system 110 (e.g., one or more devices of acquirer system 110). In some non-limiting embodiments or aspects, a remote computer system (not shown) may be in communication with user device 808. For example, the remote computer system may be the same as or similar to one or more devices of transaction service provider system 102. Additionally or alternatively, the remote computer system may be implemented (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

In some non-limiting embodiments or aspects, user device 808 may have at least one output component 808j. In some non-limiting embodiments or aspects, output component 808j may be the same as or similar to output component 408j, 508j, 608j, and/or 708j. In some non-limiting embodiments or aspects, output component(s) 808j may be the same as or similar to output component 212. Additionally or alternatively, for the purpose of illustration, output component(s) 808j may include a display. In some non-limiting embodiments or aspects, user device 808 may have at least one input component 808k. In some non-limiting embodiments or aspects, input component(s) 808k may be the same as or similar to input component(s) 408k, 508k, 608k, and/or 708k. In some non-limiting embodiments or aspects, input component(s) 808k may be the same as or similar to input component 210. Additionally or alternatively, for the purpose of illustration, input component(s) 808k may include a touchscreen display (or other pointing device such as a mouse), a button, and/or the like.

In some non-limiting embodiments or aspects, user device 808 may display (e.g., using output component 808j) a graphical user interface. For example, the graphical user interface may include a polygon 808a (e.g., a square). For example, the polygon 808a may have at least three edges 808b (e.g., four edges 808b), as described herein. In some non-limiting embodiments or aspects, an icon 808c may be at a position (e.g., first position) within the polygon 808a, as described herein. For example, the (first) position may be an initial or default position, as described herein. Additionally or alternatively, the (first) position may be selected based on input of the user, may be a position where the user previously moved the icon, may be a representation of a previous/current state of the rules (e.g., based on previous/current settings, parameters, and/or the like), and/or the like, as described herein.

In some non-limiting embodiments or aspects, the polygon 808a may have vertices 808g between each pair of adjacent edges of the polygon, as described herein. Additionally or alternatively, the vertices 808g at the ends of each edge 808b and the icon 808c may define a triangular area 808i associated with each edge 808b, as described herein. In some non-limiting embodiments or aspects, each triangular area 808i may include a different color, as described herein. Additionally or alternatively, the graphical user interface may include a line/arrow 808h connecting each vertex 808g to the icon 808c, as described herein. For example, each line/arrow 808h may be a side of at least one triangular area 808i, as described herein.

In some non-limiting embodiments or aspects, the graphical user interface may include a textual label 808d associated with each edge 808b of the polygon 808a, as described herein. Additionally or alternatively, the graphical user interface may include a legend 808e, as described herein. In some non-limiting embodiments or aspects, the graphical user interface may include additional graphical elements (e.g., buttons, checkboxes, dropdown menus, and/or the like) for input, as described herein. For example, the graphical user interface may include buttons 808f (e.g., for applying and/or canceling the user input, for displaying the full statistics/metrics information, and/or the like), as described herein.

In some non-limiting embodiments or aspects, each section (e.g., triangular area 808i) of the polygon 808a may represent a pillar (e.g., potential outcome and/or concept) of a balanced fraud management approach. In some non-limiting embodiments or aspects, the (first) position of the icon 808c may be a default position (e.g., a "balanced" approach), and the icon may be equidistant from each edge 808b of the polygon 808a. For example, with the icon 808c in such a position, the weighting for each potential outcome (e.g., as represented by each edge) may be equal (e.g., 25%, if the polygon 808a is a square). Additionally or alternatively, the sum of the weights (e.g., expressed in percentages or fractions/decimals) may sum to a predetermined amount (e.g., 100% for percentages or 1 for fractions/decimals). In some non-limiting embodiments or aspects, the weighting of each potential outcome (e.g., corresponding to each edge 808b) may be displayed in a corresponding label 808d. Additionally or alternatively, the legend 808e may display statistics, metrics, and/or the like (e.g., associated with a predicted/estimated performance, predicted/estimated outcomes, and/or the like, as described herein) based on the position of the icon 808c, as described herein. In some non-limiting embodiments or aspects, if a user moves the icon 808c (e.g., by interaction and/or input with the user device 808, such as dragging the icon 808c), the weighting of each edge 808b and the predicted/estimated statistics, metrics, and/or the like in the legend 808e may change, as described herein.

In some non-limiting embodiments or aspects, a first edge 808b of a polygon 808a (e.g., a square) may be associated with an outcome such as Accept, as described herein. Additionally or alternatively, a second edge 808b of the polygon 808a may be associated with an outcome such as Reject, as described herein. Additionally or alternatively, a third edge 808b of the polygon 808a may be associated with an outcome such as Review, as described herein. Additionally or alternatively, a fourth edge 808b of the polygon 808a may be associated with an outcome such as Challenge (AFDS), as described herein.

Figure 9:
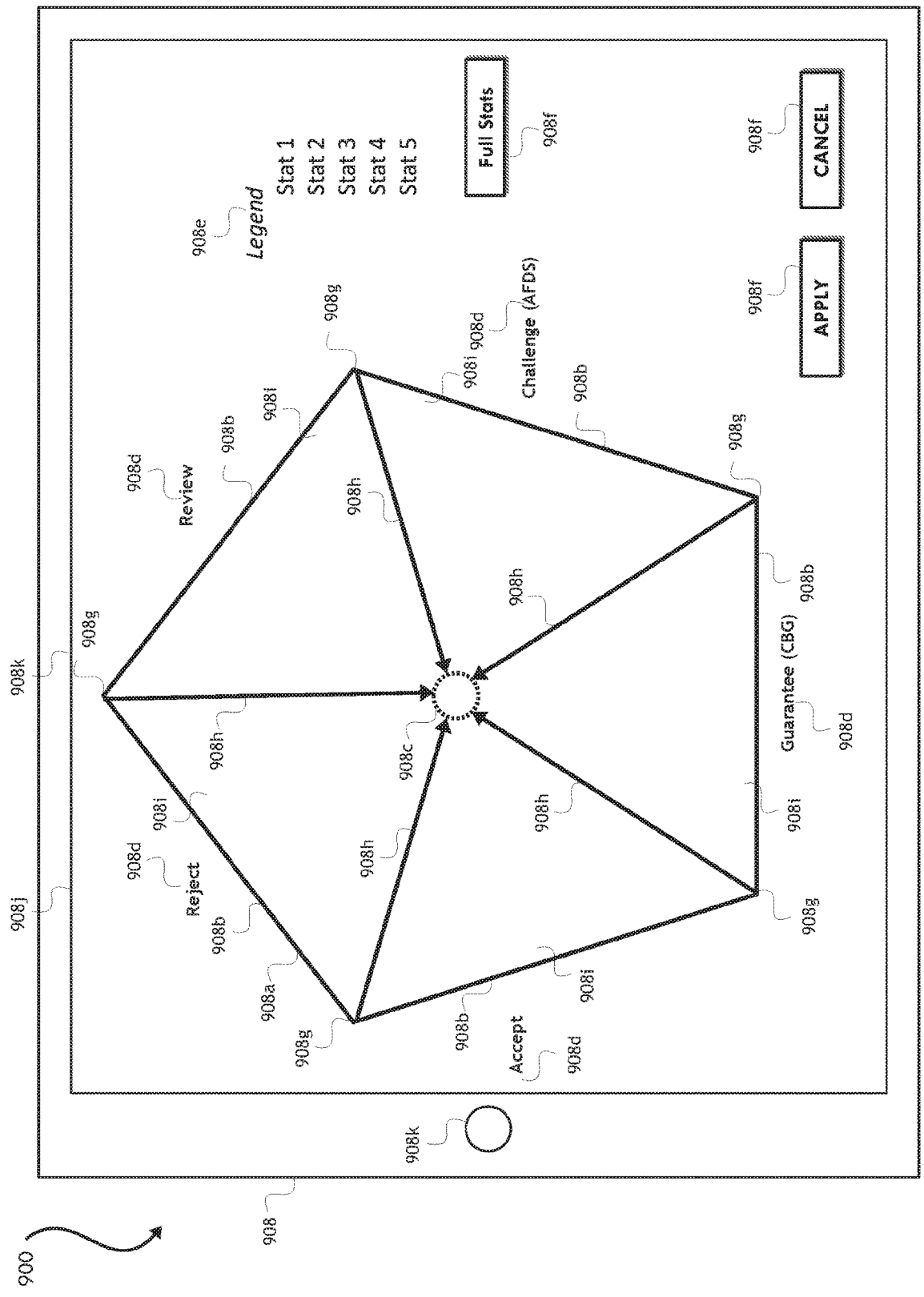
FIG. 9 is a diagram of some non-limiting embodiments or aspects of a graphical user interface according to an implementation of some non-limiting embodiments or aspects of the process shown in FIG. 3.

Referring now to FIG. 9, FIG. 9 is a diagram of an exemplary graphical user interface according to an implementation 900 of some non-limiting embodiments or aspects relating to process 300 shown in FIG. 3. As shown in FIG. 9, implementation 900 may include user device 908. In some non-limiting embodiments or aspects, user device 908 may be the same as or similar to user device 408, 508, 608, 708, and/or 808. In some non-limiting embodiments or aspects, with reference to FIG. 4, user device 908 may be the same as or similar to one or more devices of merchant system 108. Additionally or alternatively, user device 908 may be implemented (e.g., completely, partially, and/or the like) by another system, another device, another group of systems, or another group of devices, separate from or including merchant system 108, such as transaction service provider system 102 (e.g., one or more devices of transaction service provider system 102), issuer system 104 (e.g., one or more devices of issuer system 104), customer device 106, and/or acquirer system 110 (e.g., one or more devices of acquirer system 110). In some non-limiting embodiments or aspects, a remote computer system (not shown) may be in communication with user device 908. For example, the remote computer system may be the same as or similar to one or more devices of transaction service provider system 102. Additionally or alternatively, the remote computer system may be implemented (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

In some non-limiting embodiments or aspects, user device 908 may have at least one output component 908j. In some non-limiting embodiments or aspects, output component 908j may be the same as or similar to output component 408j, 508j, 608j, 708j, and/or 808j. In some non-limiting embodiments or aspects, output component(s) 908j may be the same as or similar to output component 212. Additionally or alternatively, for the purpose of illustration, output component(s) 908j may include a display. In some non-limiting embodiments or aspects, user device 908 may have at least one input component 908k. In some non-limiting embodiments or aspects, input component(s) 908k may be the same as or similar to input component(s) 408k, 508k, 608k, 708k, and/or 808k. In some non-limiting embodiments or aspects, input component(s) 908k may be the same as or similar to input component 210. Additionally or alternatively, for the purpose of illustration, input component(s) 908k may include a touchscreen display (or other pointing device such as a mouse), a button, and/or the like.

In some non-limiting embodiments or aspects, user device 908 may display (e.g., using output component 908j) a graphical user interface. For example, the graphical user interface may include a polygon 908a (e.g., a pentagon). For example, the polygon 908a may have at least three edges 908b (e.g., five edges 908b), as described herein. In some non-limiting embodiments or aspects, an icon 908c may be at a position (e.g., first position) within the polygon 908a, as described herein. For example, the (first) position may be an initial or default position, as described herein. Additionally or alternatively, the (first) position may be selected based on input of the user, may be a position where the user previously moved the icon, may be a representation of a previous/current state of the rules (e.g., based on previous/current settings, parameters, and/or the like), and/or the like, as described herein.

In some non-limiting embodiments or aspects, the polygon 908a may have vertices 908g between each pair of adjacent edges of the polygon, as described herein. Additionally or alternatively, the vertices 908g at the ends of each edge 908b and the icon 908c may define a triangular area 908i associated with each edge 908b, as described herein. In some non-limiting embodiments or aspects, each triangular area 908i may include a different color, as described herein. Additionally or alternatively, the graphical user interface may include a line/arrow 908h connecting each vertex 908g to the icon 908c, as described herein. For example, each line/arrow 908h may be a side of at least one triangular area 908i, as described herein.

In some non-limiting embodiments or aspects, the graphical user interface may include a textual label 908d associated with each edge 908b of the polygon 908a, as described herein. Additionally or alternatively, the graphical user interface may include a legend 908e, as described herein. In some non-limiting embodiments or aspects, the graphical user interface may include additional graphical elements (e.g., buttons, checkboxes, dropdown menus, and/or the like) for input, as described herein. For example, the graphical user interface may include buttons 908f (e.g., for applying and/or canceling the user input, for displaying the full statistics/metrics information, and/or the like), as described herein.

In some non-limiting embodiments or aspects, each section (e.g., triangular area 908i) of the polygon 908a may represent a pillar (e.g., potential outcome and/or concept) of a balanced fraud management approach. In some non-limiting embodiments or aspects, the (first) position of the icon 908c may be a default position (e.g., a "balanced" approach), and the icon may be equidistant from each edge 908b of the polygon 908a. For example, with the icon 908c in such a position, the weighting for each potential outcome (e.g., as represented by each edge) may be equal (e.g., 20%, if the polygon 808a is a pentagon). Additionally or alternatively, the sum of the weights (e.g., expressed in percentages or fractions/decimals) may sum to a predetermined amount (e.g., 100% for percentages or 1 for fractions/decimals). In some non-limiting embodiments or aspects, the weighting of each potential outcome (e.g., corresponding to each edge 908b) may be displayed in a corresponding label 908d. Additionally or alternatively, the legend 908e may display statistics, metrics, and/or the like (e.g., associated with a predicted/estimated performance, predicted/estimated outcomes, and/or the like, as described herein) based on the position of the icon 908c, as described herein. In some non-limiting embodiments or aspects, if a user moves the icon 908c (e.g., by interaction and/or input with the user device 908, such as dragging the icon 908c), the weighting of each edge 908b and the predicted/estimated statistics, metrics, and/or the like in the legend 908e may change, as described herein.

In some non-limiting embodiments or aspects, a first edge 908b of a polygon 908a (e.g., a square) may be associated with an outcome such as Accept, as described herein. Additionally or alternatively, a second edge 908b of the polygon 908a may be associated with an outcome such as Reject, as described herein. Additionally or alternatively, a third edge 908b of the polygon 908a may be associated with an outcome such as Review, as described herein. Additionally or alternatively, a fourth edge 908b of the polygon 908a may be associated with an outcome, such as Challenge (AFDS), as described herein. Additionally or alternatively, a fifth edge 908b of the polygon 908a may be associated with an outcome, such as Guarantee (CBG), as described herein.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for configuring at least one rule, comprising:
   displaying, with at least one processor, a graphical user interface comprising a polygon having at least three edges and an icon at a first position within the polygon, wherein each edge of the polygon is associated with a potential outcome of at least one rule;
   receiving, with the at least one processor, an input to move the icon to a second position within the polygon;
   displaying, with at least one processor, the graphical user interface with the icon at the second position within the polygon;
   determining, with the at least one processor, a distance from the second position of the icon to each edge of the polygon;
   automatically adjusting, with the at least one processor, the at least one rule based on the distance from the second position of the icon to each edge of the polygon, wherein, after adjusting the at least one rule, a probability of each potential outcome is inversely related to a distance from the second position of the icon to a respective edge of the at least three edges;
   receiving, at a remote computer system, transaction data associated with a plurality of payment transactions; and
   determining, with the remote computer system, an outcome for each payment transaction of the plurality of payment transactions based on the at least one rule, wherein the outcome for each payment transaction comprises one of the potential outcomes of the at least one rule,
   wherein the at least one rule has at least one parameter, wherein, before receiving the input, a value of the at least one parameter is based on a distance from the first position of the icon to each edge of the polygon, and wherein adjusting the at least one rule comprises adjusting the value of the at least one parameter based on the distance from the second position of the icon to each edge of the polygon,
   wherein the at least one rule comprises a first rule, the first rule comprising generating a score, wherein the at least one parameter of the first rule comprises a first threshold and a second threshold greater than the first threshold, and wherein:
      a first potential outcome of the first rule is associated with the score being below the first threshold;
      a second potential outcome of the first rule is associated with the score being between the first threshold and the second threshold; and
      a third potential outcome of the first rule is associated with the score being above the second threshold.

2. The method of claim 1, wherein, before receiving the input, a probability of each potential outcome is inversely related to a distance from the first position of the icon to a respective edge of the at least three edges.

3. The method of claim 1, wherein a probability of each potential outcome is based at least partially on the value of the at least one parameter.

4. The method of claim 1, wherein the at least one rule comprises a plurality of rules, and wherein adjusting the at least one rule comprises at least one of:
   removing a rule from the plurality of rules; and
   adding a rule to the plurality of rules.

5. The method of claim 1, wherein the at least one rule is stored on the remote computer system, and wherein adjusting the at least one rule comprises communicating adjustment data associated with the distance from the second position of the icon to each edge of the polygon to the remote computer system.

6. The method of claim 1, further comprising:
   displaying, with the at least one processor, a textual label within the graphical user interface adjacent each edge of the polygon, each textual label associated with the potential outcome associated with a respective edge of the at least three edges of the polygon.

7. The method of claim 1, wherein the graphical user interface further comprises a vertex between each pair of adjacent edges of the at least three edges, the vertices at ends of each edge and the icon defining a triangular area associated with each edge, each triangular area comprising a different color.

8. A system for configuring at least one rule, comprising:
   a user device configured to:
      display a graphical user interface comprising a polygon having at least three edges and an icon at a first position within the polygon, wherein each edge of the polygon is associated with a potential outcome of at least one rule;
      receive an input to move the icon to a second position within the polygon;
      display the graphical user interface with the icon at the second position within the polygon; and
      transmit position data associated with the second position of the icon within the polygon; and
   a remote computer system configured to:
      receive the position data associated with the second position of the icon within the polygon transmitted from the user device; and
      automatically adjust the at least one rule based on a distance from the second position of the icon to each edge of the polygon, wherein, after adjusting the at least one rule, a probability of each potential outcome is inversely related to a distance from the second position of the icon to a respective edge of the at least three edges;

receive transaction data associated with a plurality of payment transactions; and determine an outcome for each payment transaction of the plurality of payment transactions based on the at least one rule, wherein the outcome for each payment transaction comprises one of the potential outcomes of the at least one rule, wherein the at least one rule has at least one parameter, wherein, before receiving the input, a value of the at least one parameter is based on a distance from the first position of the icon to each edge of the polygon, and wherein adjusting the at least one rule comprises adjusting the value of the at least one parameter based on the distance from the second position of the icon to each edge of the polygon, wherein the at least one rule comprises a first rule, the first rule comprising generating a score, wherein the at least one parameter of the first rule comprises a first threshold and a second threshold greater than the first threshold, and wherein:
- a first potential outcome of the first rule is associated with the score being below the first threshold;
- a second potential outcome of the first rule is associated with the score being between the first threshold and the second threshold; and
- a third potential outcome of the first rule is associated with the score being above the second threshold.

9. The system of claim 8, wherein the user device is further configured to determine the distance from the second position of the icon to each edge of the polygon.

10. The system of claim 8, wherein the remote computer system is further configured to determine the distance from the second position of the icon to each edge of the polygon.

11. The system of claim 8, wherein, before receiving the input, a probability of each potential outcome is inversely related to a distance from the first position of the icon to a respective edge of the at least three edges.

12. The system of claim 6, wherein a probability of each potential outcome is based at least partially on the value of the at least one parameter.

13. The system of claim 8, wherein the at least one rule comprises a plurality of rules, and wherein adjusting the at least one rule comprises at least one of:
- removing a rule from the plurality of rules; and
- adding a rule to the plurality of rules.

14. The system of claim 8, wherein the user device is further configured to:
- display a textual label within the graphical user interface adjacent each edge of the polygon, each textual label associated with the potential outcome associated with a respective edge of the at least three edges of the polygon.

15. The system of claim 8, wherein the graphical user interface further comprises a vertex between each pair of adjacent edges of the at least three edges, the vertices at ends of each edge and the icon defining a triangular area associated with each edge, each triangular area comprising a different color.

16. A computer program product for configuring at least one rule, the computer program product comprising at least one non-transitory computer-readable medium including one or more instructions that, when executed by at least one processor, cause the at least one processor to:

display a graphical user interface comprising a polygon having at least three edges and an icon at a first position within the polygon, wherein each edge of the polygon is associated with a potential outcome of at least one rule;

receive an input to move the icon to a second position within the polygon;

display the graphical user interface with the icon at the second position within the polygon;

determine a distance from the second position of the icon to each edge of the polygon;

automatically adjust the at least one rule based on the distance from the second position of the icon to each edge of the polygon, wherein, after adjusting the at least one rule, a probability of each potential outcome is inversely related to a distance from the second position of the icon to a respective edge of the at least three edges;

receive transaction data associated with a plurality of payment transactions; and determine an outcome for each payment transaction of the plurality of payment transactions based on the at least one rule, wherein the outcome for each payment transaction comprises one of the potential outcomes of the at least one rule, wherein the at least one rule has at least one parameter, wherein, before receiving the input, a value of the at least one parameter is based on a distance from the first position of the icon to each edge of the polygon, and wherein adjusting the at least one rule comprises adjusting the value of the at least one parameter based on the distance from the second position of the icon to each edge of the polygon, wherein the at least one rule comprises a first rule, the first rule comprising generating a score, wherein the at least one parameter of the first rule comprises a first threshold and a second threshold greater than the first threshold, and wherein:
- a first potential outcome of the first rule is associated with the score being below the first threshold;
- a second potential outcome of the first rule is associated with the score being between the first threshold and the second threshold; and
- a third potential outcome of the first rule is associated with the score being above the second threshold.

* * * * *

UNITED STATES PATENT AND TRADEMARK OFFICE
CERTIFICATE OF CORRECTION

PATENT NO. : 11,249,634 B2  
APPLICATION NO. : 17/055696  
DATED : February 15, 2022  
INVENTOR(S) : Nathan Ryan Wood et al.

Page 1 of 1

It is certified that error appears in the above-identified patent and that said Letters Patent is hereby corrected as shown below:

In the Claims

Column 39, Line 41, Claim 12, delete "claim 6," and insert -- claim 8, --

Signed and Sealed this
Tenth Day of May, 2022

Katherine Kelly Vidal  
*Director of the United States Patent and Trademark Office*